United States Patent [19]

Serita et al.

[11] Patent Number: 5,088,076
[45] Date of Patent: Feb. 11, 1992

[54] AUTOMATIC DISK CHANGER WITH DISK CASE AND CLAMPER

[75] Inventors: Kaoru Serita; Masaaki Kiyomiya; Jun Takahashi; Masatoshi Watanabe; Masaki Iwamoto, all of Saitama, Japan

[73] Assignee: Pioneer Electronic Corporation, Tokyo, Japan

[21] Appl. No.: 473,244

[22] Filed: Jan. 31, 1990

[30] Foreign Application Priority Data

Jan. 31, 1989 [JP] Japan .................. 1-19559

[51] Int. Cl.[5] .................. G11B 17/22; G11B 33/02
[52] U.S. Cl. .................. 369/36; 369/34; 369/38; 369/39; 369/151; 369/75.2; 369/77.1; 369/77.2
[58] Field of Search .................. 369/34, 36, 38, 39, 369/195, 199, 75.1, 75.2, 77.1, 77.2; 360/99.02, 99.06, 99.07

[56] References Cited

U.S. PATENT DOCUMENTS

| | | | |
|---|---|---|---|
| 4,692,916 | 9/1987 | Rouws | 369/75.2 |
| 4,829,504 | 5/1989 | Sunaga et al. | 369/75.2 |
| 4,841,499 | 6/1989 | Takahashi et al. | 369/36 X |
| 4,949,328 | 8/1990 | Kase et al. | 369/195 X |

*Primary Examiner*—Stuart S. Levy
*Assistant Examiner*—Tien B Pham
*Attorney, Agent, or Firm*—Sughrue, Mion, Zinn Macpeak & Seas

[57] ABSTRACT

An automatic disk changer in which a tray guide for storing a disk while it is not being played is provided in a case. A tray for containing the disk is guided by the tray guide. The tray has nearly the same size as the disk to be contained in the tray, and has a window through which a laser beam from a pickup passes and which extends to the peripheral portion of the tray. The disk changer includes a disk player which is also provided with a further tray guide for guiding the tray and is installed so that the disk is pinched and moved up by a turntable unit and a clamper and the tray is thereafter moved in the direction of movement of the pickup.

6 Claims, 24 Drawing Sheets

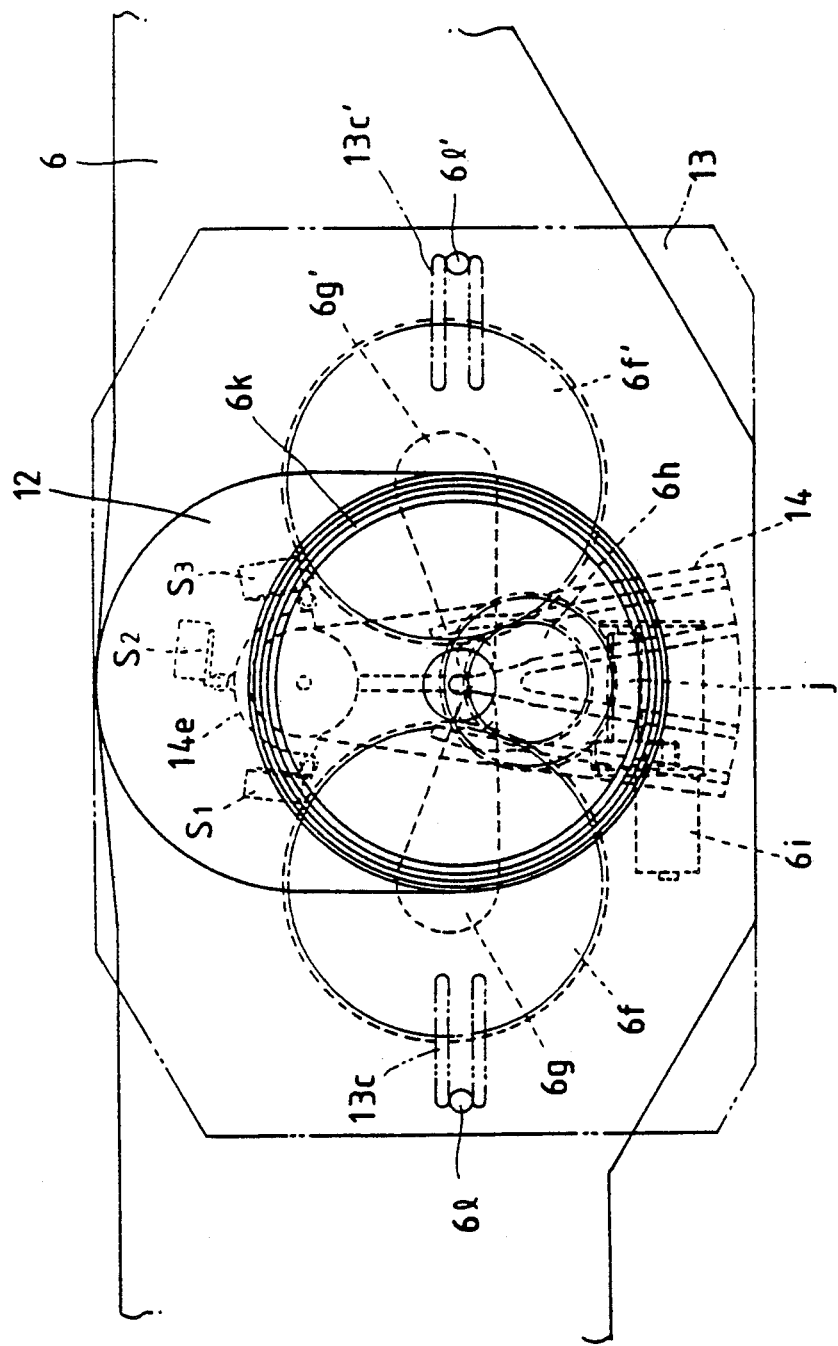

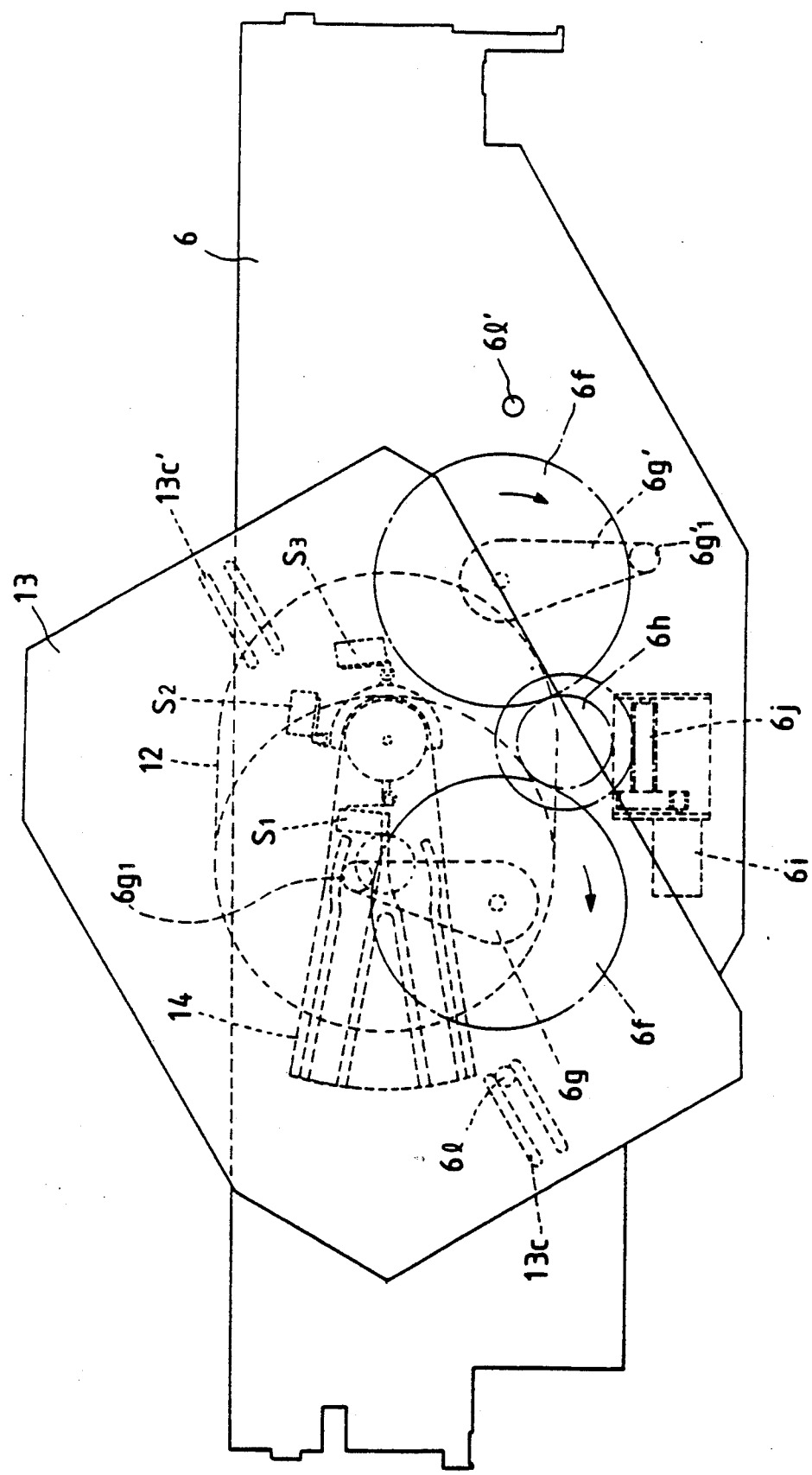

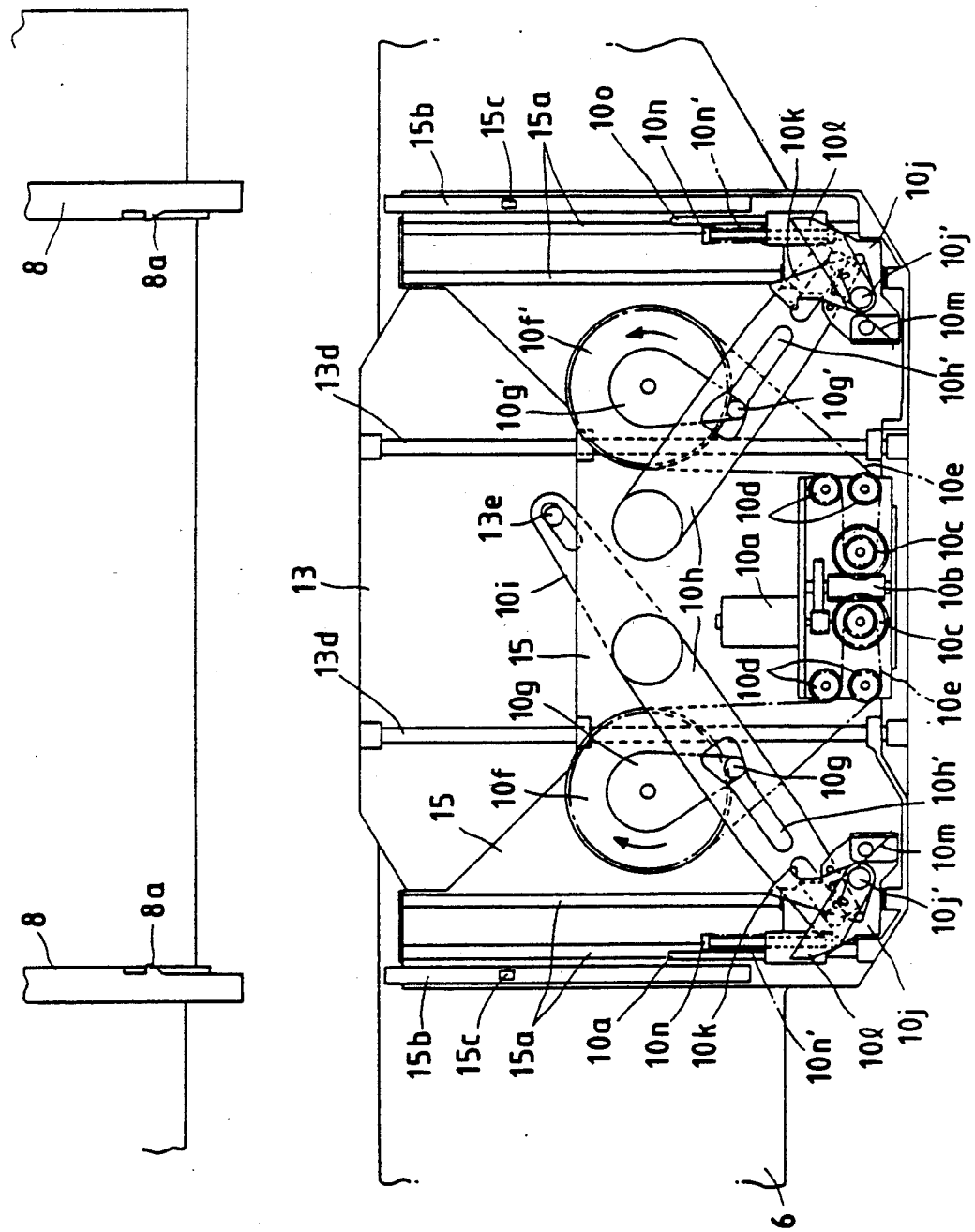

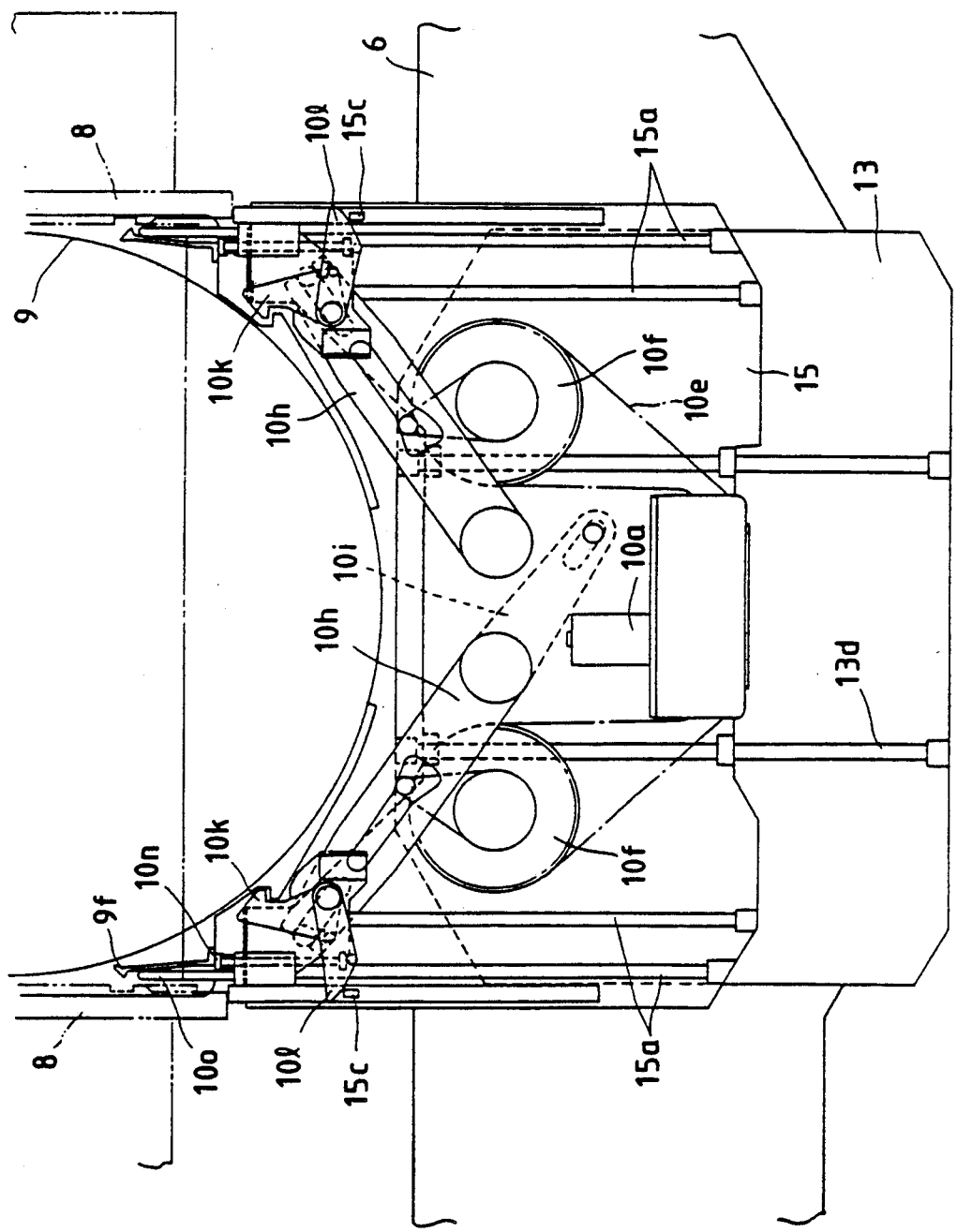

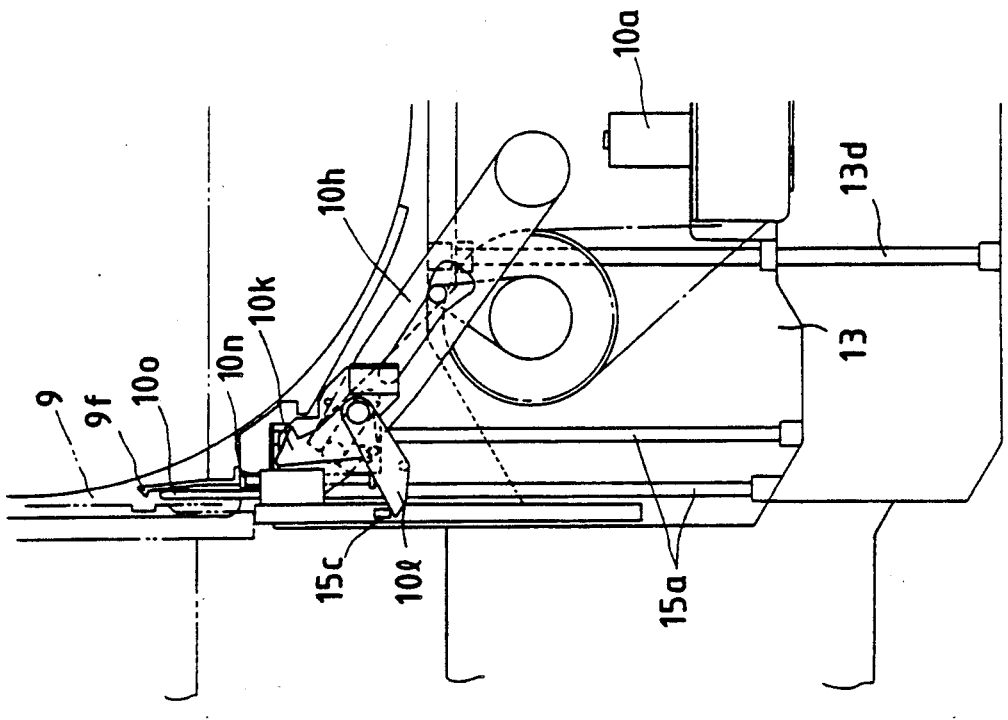

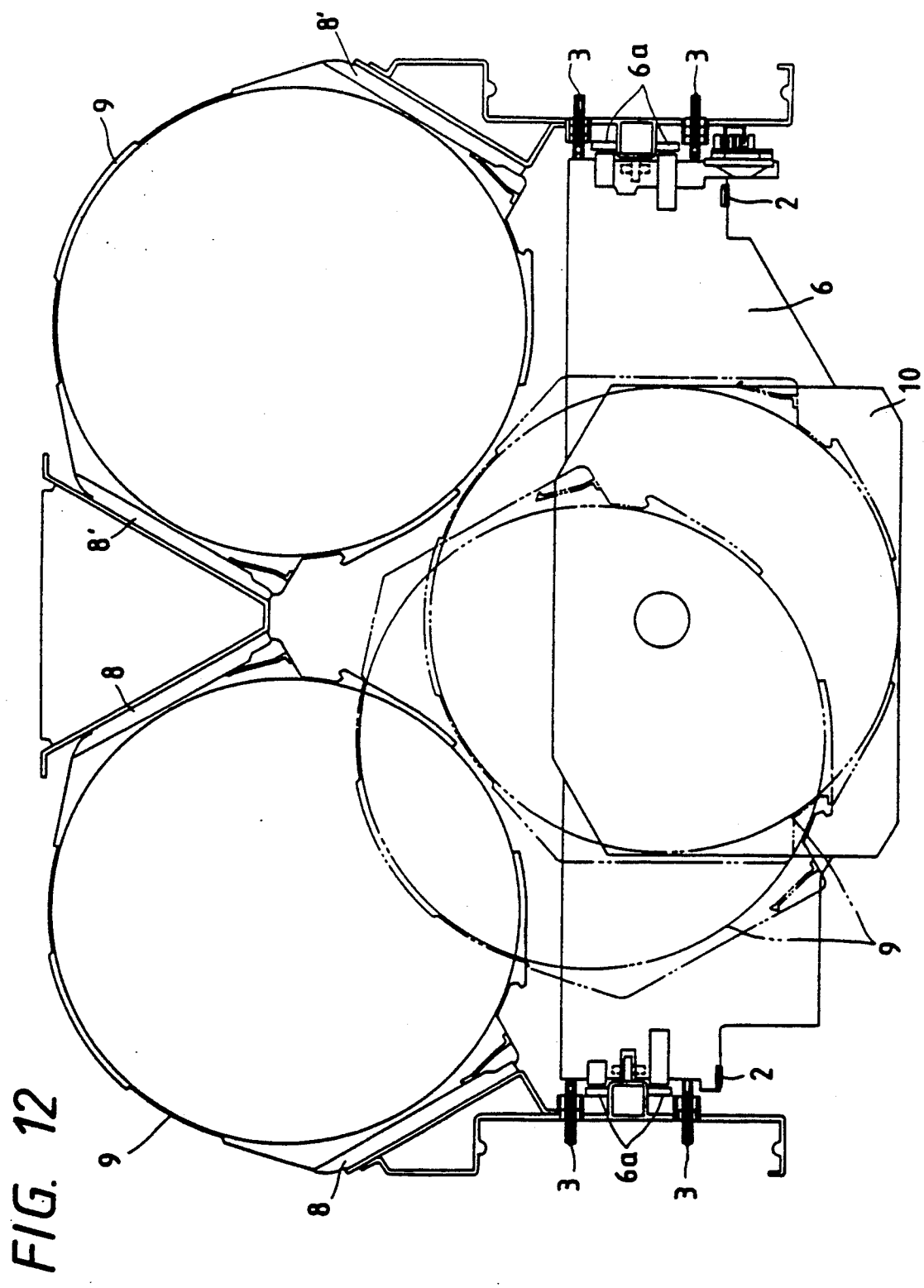

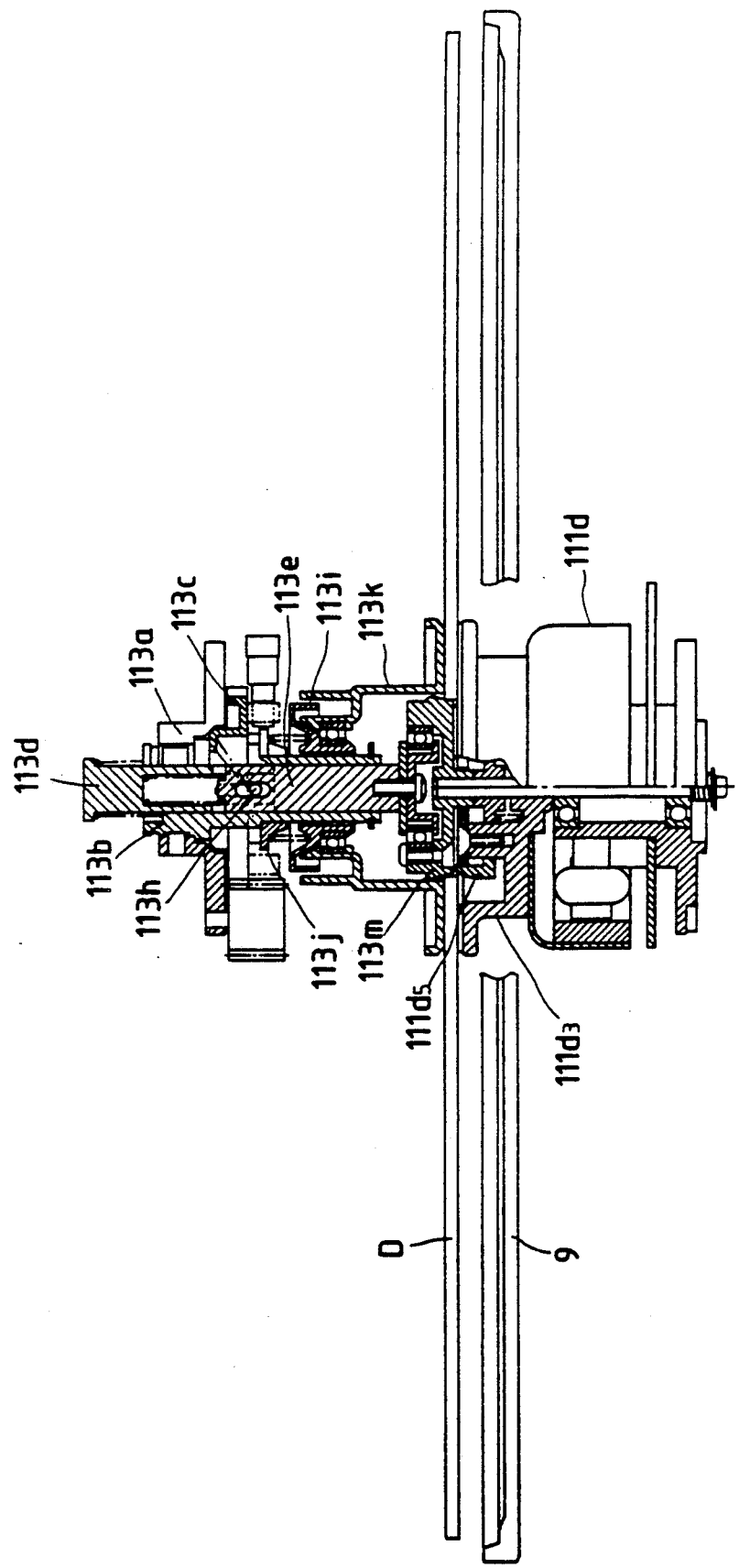

AUTOMATIC DISK CHANGER WITH DISK CASE AND CLAMPER

BACKGROUND OF THE INVENTION

The present invention relates to an automatic disk changer which houses a large number of disks such as a video disk and a compact disk and is manipulated outside to choose a desired one of the disks to play the chosen disk.

In a conventional automatic disk changer of such kind, a tray containing a disk is transferred by a tray transfer means and guided by a tray guide, and the disk is pinched and moved up by a turntable unit and a clamper so that a laser beam from a pickup is irradiated upon the disk through the window of the tray to read a recorded signal from the disk.

Since the window of the tray of the conventional automatic disk changer needs to extend to the peripheral portion of the disk to make it possible to read the recorded signal from the peripheral portion of the disk, the width of the tray needs to be made large to result in expanding the size of the tray. For that reason, there is a problem that the size of a case for housing the tray is large.

SUMMARY OF THE INVENTION

The present invention is made in order to solve the abovementioned problem.

Accordingly, it is an object of the present invention to provide an automatic disk changer in which a tray is moved in the direction of movement of a pickup when a recorded signal is to be read from a disk by the pickup, so that the size of the window of the tray is substantially reduced. The size of a case is thus made smaller to render the automatic disk changer compact as a whole.

In the automatic disk changer provided in accordance with the present invention, the disk in the tray is pinched and moved up by a turntable unit and a clamper and the tray is thereafter moved in the direction of movement of the pickup. For that reason, the size of the window of the tray, through which a laser beam from the pick-up passes, can be substantially reduced to make the tray compact.

BRIEF DESCRIPTION OF THE DRAWINGS

FIG. 5 is a plan view of a part of the means;

FIG. 6 is a plan view of the part of the means in a moved state;

FIG. 7 is a plan view of another part of the means;

FIGS. 9, 10 and 11 are plan views of the part in moved states;

FIGS. 12, 13 and 14 are plan views of a disk transferred by the means;

FIGS. 22, 23, 24, 25 and 26 are partial sectional views of a turntable unit and the clamper in states of pinching a disk.

DESCRIPTION OF THE PREFERRED EMBODIMENTS

An embodiment of the present invention is hereafter described with reference to the drawings attached hereto.

Figure 1:
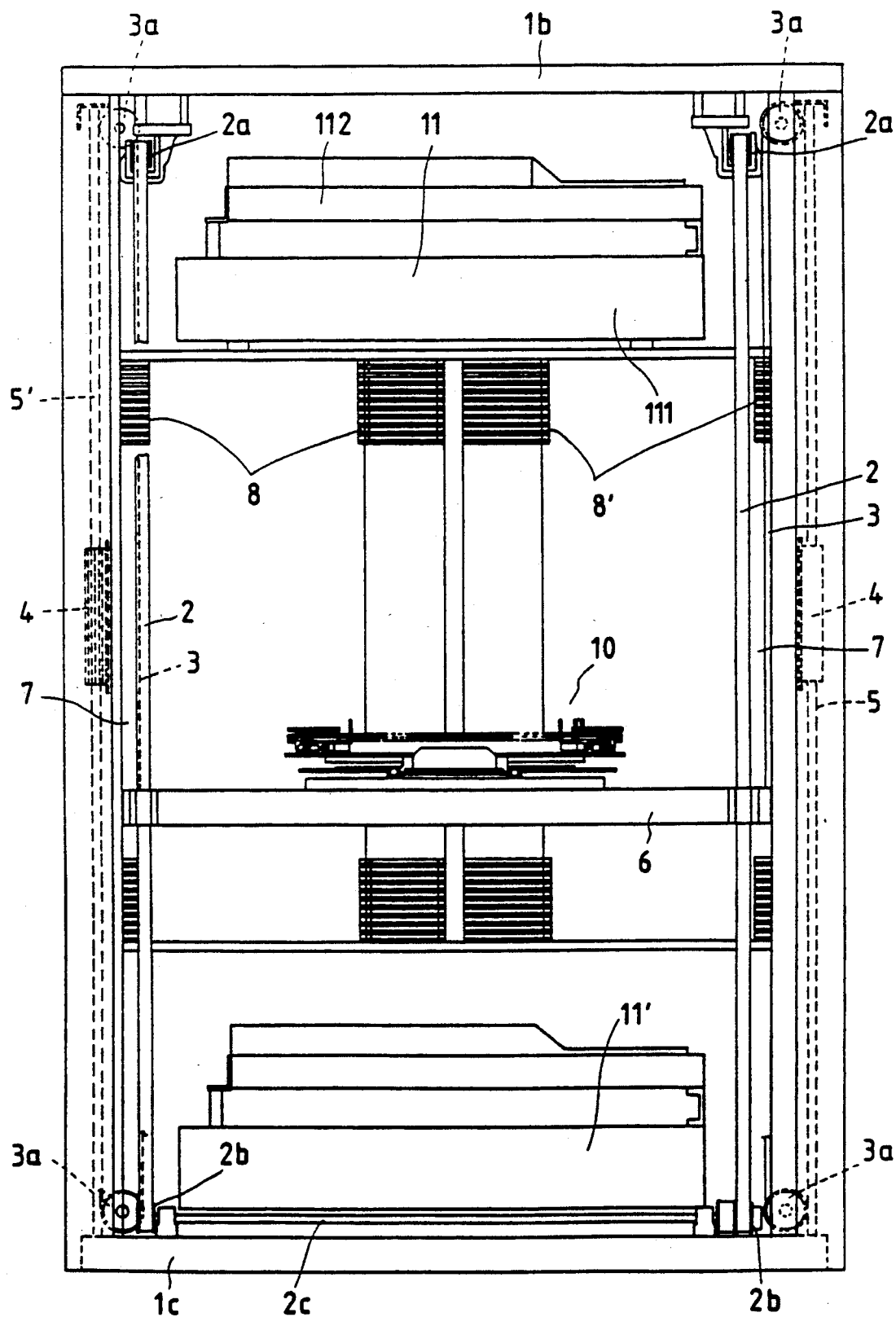
FIG. 1 is a front view of an automatic disk changer which is an embodiment of the present invention.
Figure 2:
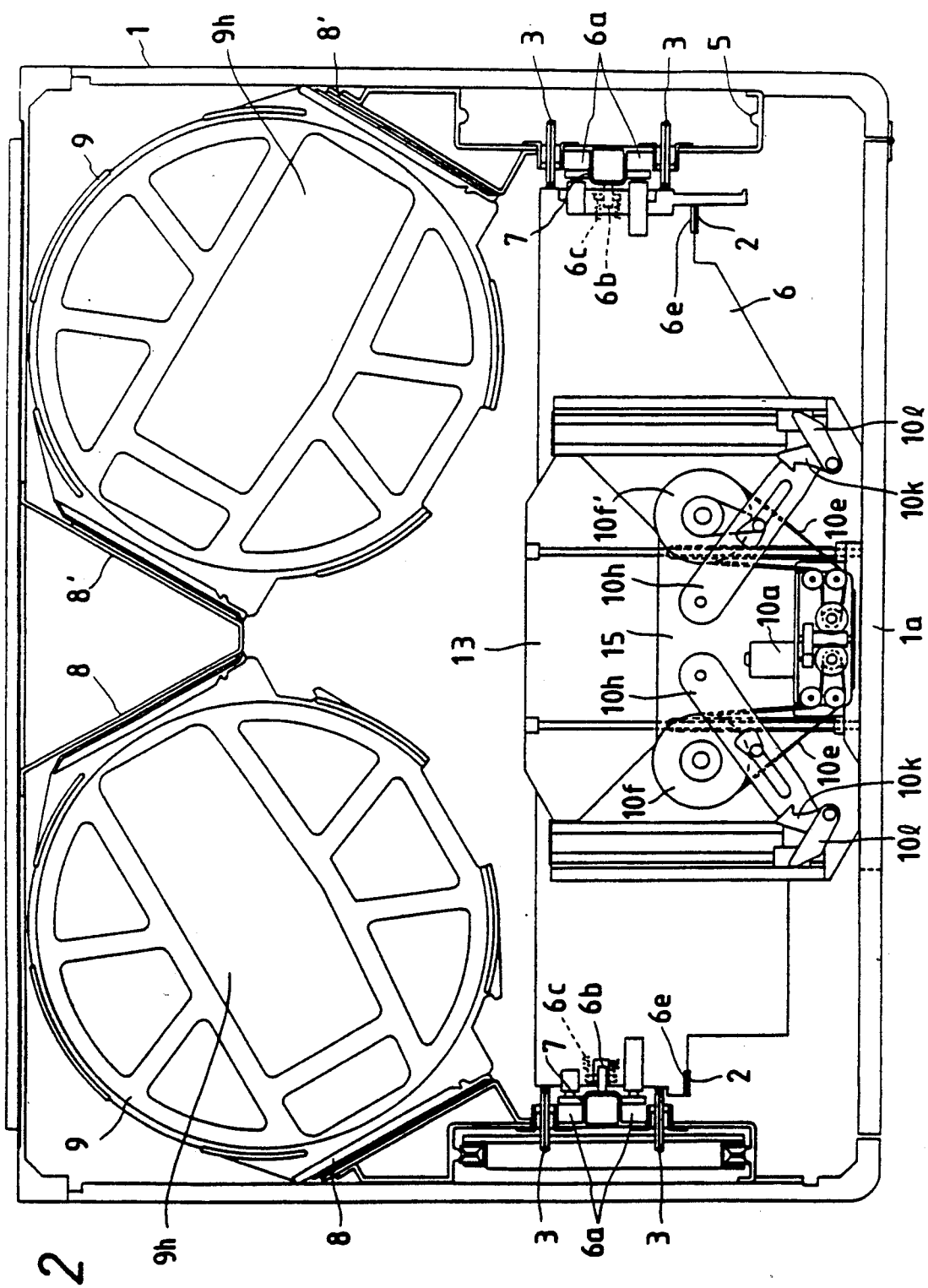
FIG. 2 is a plan view of the changer.
Figure 3:
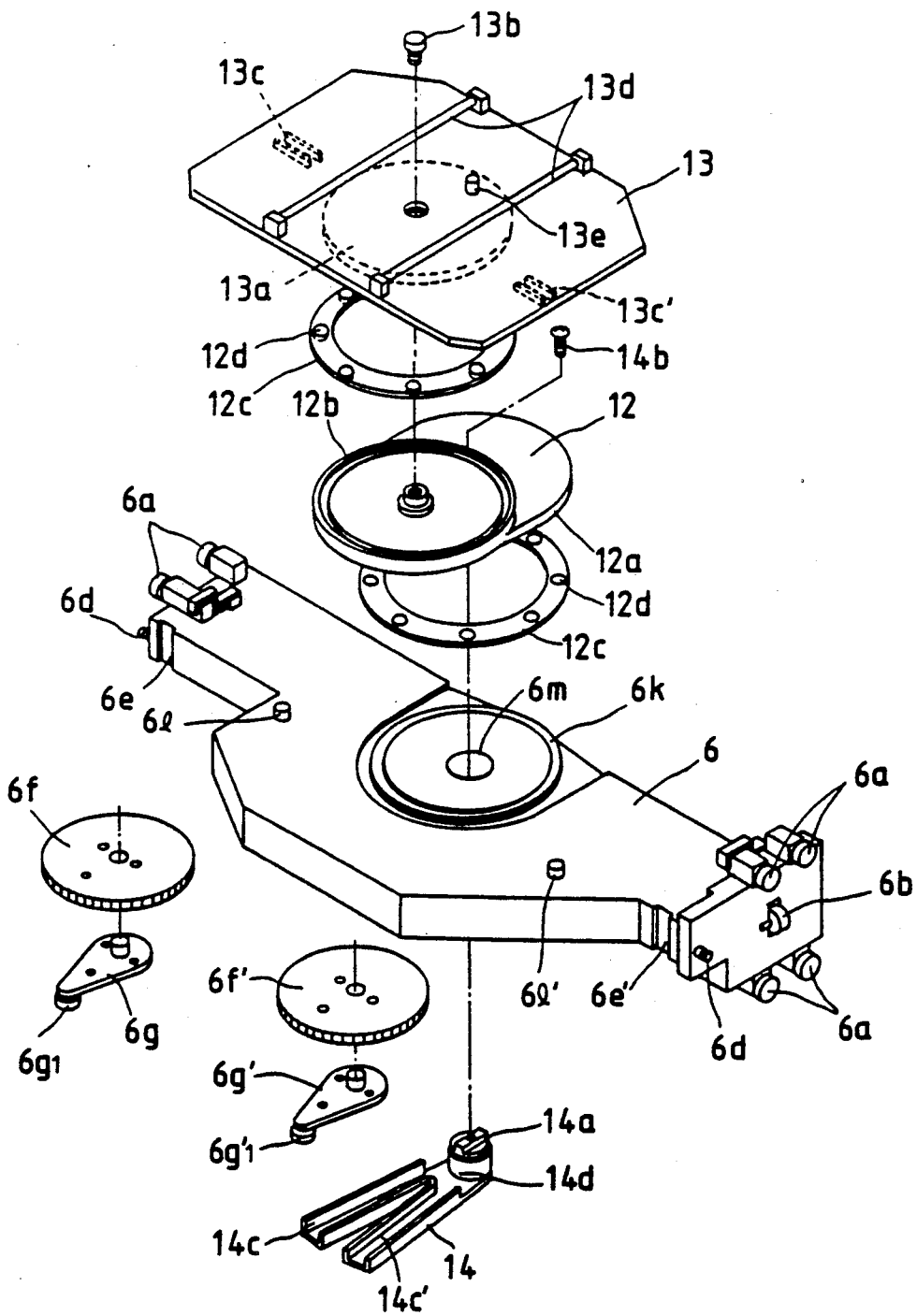
FIG. 3 is a partial perspective exploded view of the disk transfer means of the changer.

FIG. 1 is a front view of an automatic disk changer which is the embodiment. FIG. 2 is a plan view of the automatic disk changer. The changer includes a case 1, a pair of timing belts 2, endless wires 3, weights 4, guide rails 5, a moving rest 6, and guide rails 7. The case 1 is fitted with a door 1a openable forward. The timing belts 2 are wound on a right and a left timing pulleys 2a supported at the top plate, 1b of the case 1, and a right and a left timing pulleys 2b supported at the bottom plate 1c of the case. The timing belts 2 are connected to each other by a single shaft 2c so that the belts are revolved synchronously with each other when the shaft is rotated by a motor not shown in the drawings. The endless wires 3 are wound on right and left pulleys 3a supported at the top plate 1b and the bottom plate 1c. The weights 4 are secured to the ends of the wires 3 so that the weights are balanced to the moving rest 6. When the wires 3 are revolved, the weights 4 are moved while being guided by the guide rails 5 secured to the case 1. The moving rest 6 is moved while being guided by the guide rails 7 extending in parallel with the other guide rails 5. The rest 6 is coupled to the timing belts 2 and the portions of the wires 3 opposite the other portions thereof, to which the weights 4 are secured. The rest 6 is moved while being guide by the guide rails 7 as shown in FIGS. 2 and 3. Eight guide rollers 6a and two guide rollers 6b are attached to the moving rest 6 at both the ends thereof so that the guide rollers 6a are located on the fronts and rears of the guide rails 7 and the other guide rollers 6b are located on the sides of the rails. The guide rollers 6b are urged by springs 6c so that the moving rest 6 does not move either rightward or leftward relative to the guide rails 7 because of a clearance. The wires 3 are anchored to projections 6d provided on the end faces of the moving rest 6. The timing belts 2 are secured to the rest 6 in the groove 6e thereof.

Moving the rest 6 up and down is described in detail from now on. When the motor not shown in the drawings is driven, the shaft 2c is rotated to revolve the timing belts 2 to move the rest 6 up or down depending on the direction of the rotation of the motor while the rest is guided by the guide rails 7. At that time, since the weights 4 secured to the wires 3 anchored to the rest 6 are balanced to the rest, the rest is smoothly moved up or down even if the torque of the motor is not high.

Tray guides 8 and 8' are provided on a large number of levels in the case 1 at the posterior portion thereof so that the angle between the center lines of the tray guides 8 and 8' is about 60 degrees. Each of the tray guides 8 and 8' consists of a pair of right and left rails for guiding a tray 9 described hereinafter. The mutually facing sides of the rails of each of the tray guides 8 and 8' have grooves, into which the side edges of the tray 9 are inserted so that the side edges can be pulled out from the grooves.

A tray transfer means 10 is provided on the top of the moving rest 6. The means 10 functions so that the tray 9 is pulled out from the tray guide 8 or 8' and then transferred to one of disk players 11 and 11' installed in the case 1 at the upper and lower portions thereof. The means 10 also functions so that the tray 9 containing a disk D having been played by the disk player 11 or 11' is transferred back to the prescribed tray guide 8 or 8'.

Figure 4:
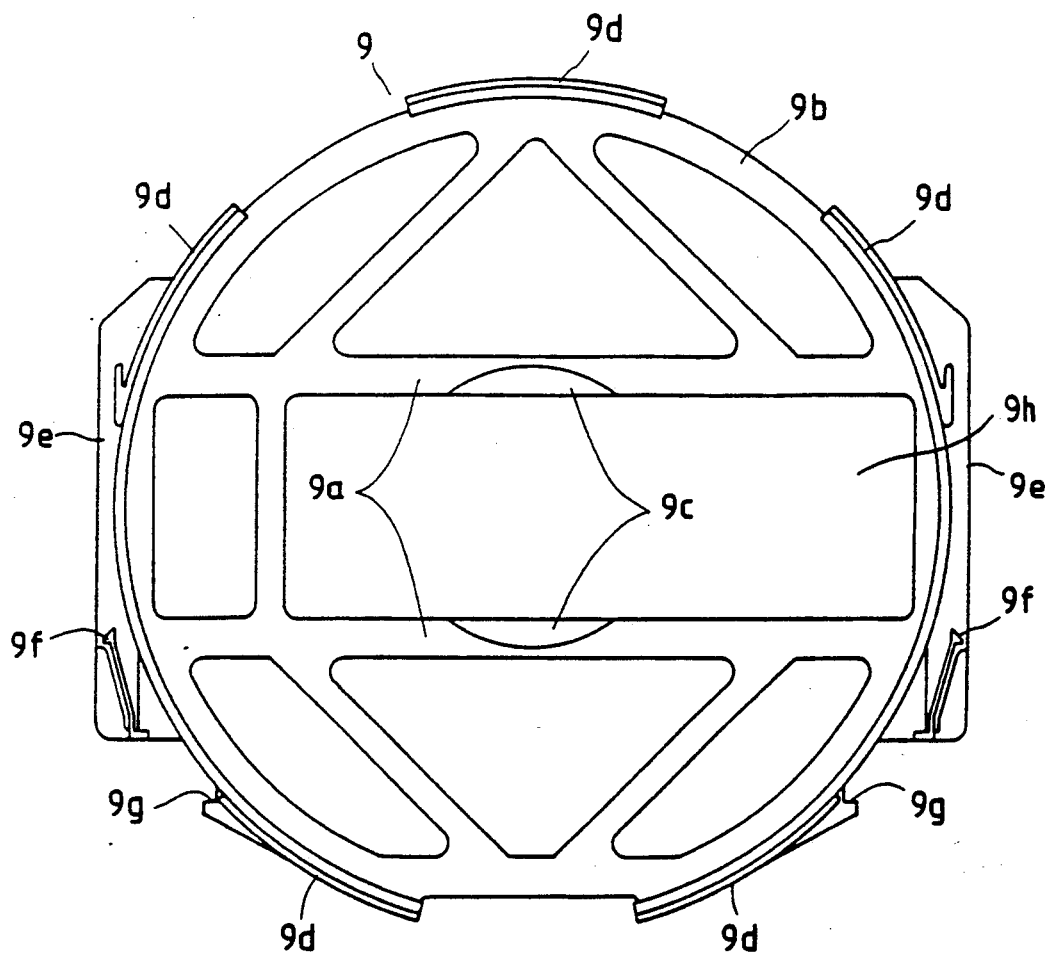
FIG. 4 is a plan view of the tray of the changer.
Figure 8:
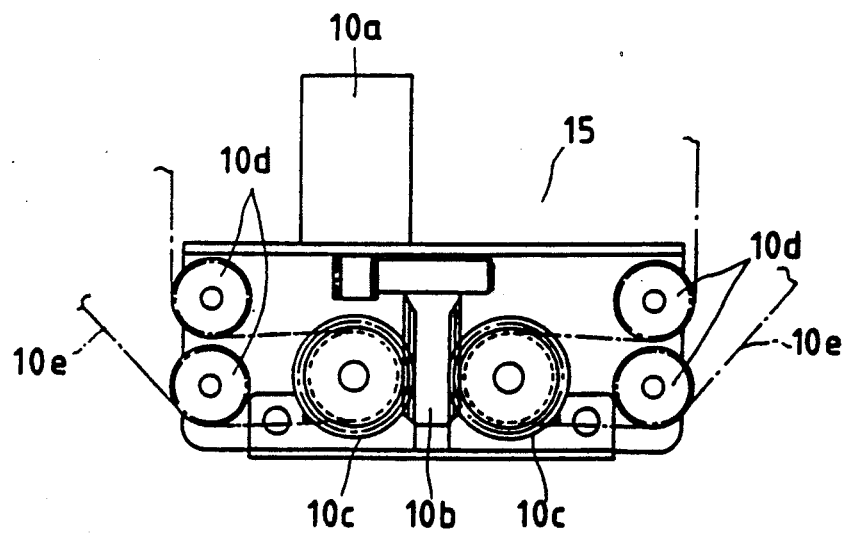
FIG. 8 is a partial enlarged plan view of the part shown in FIG. 7.
Figure 13:
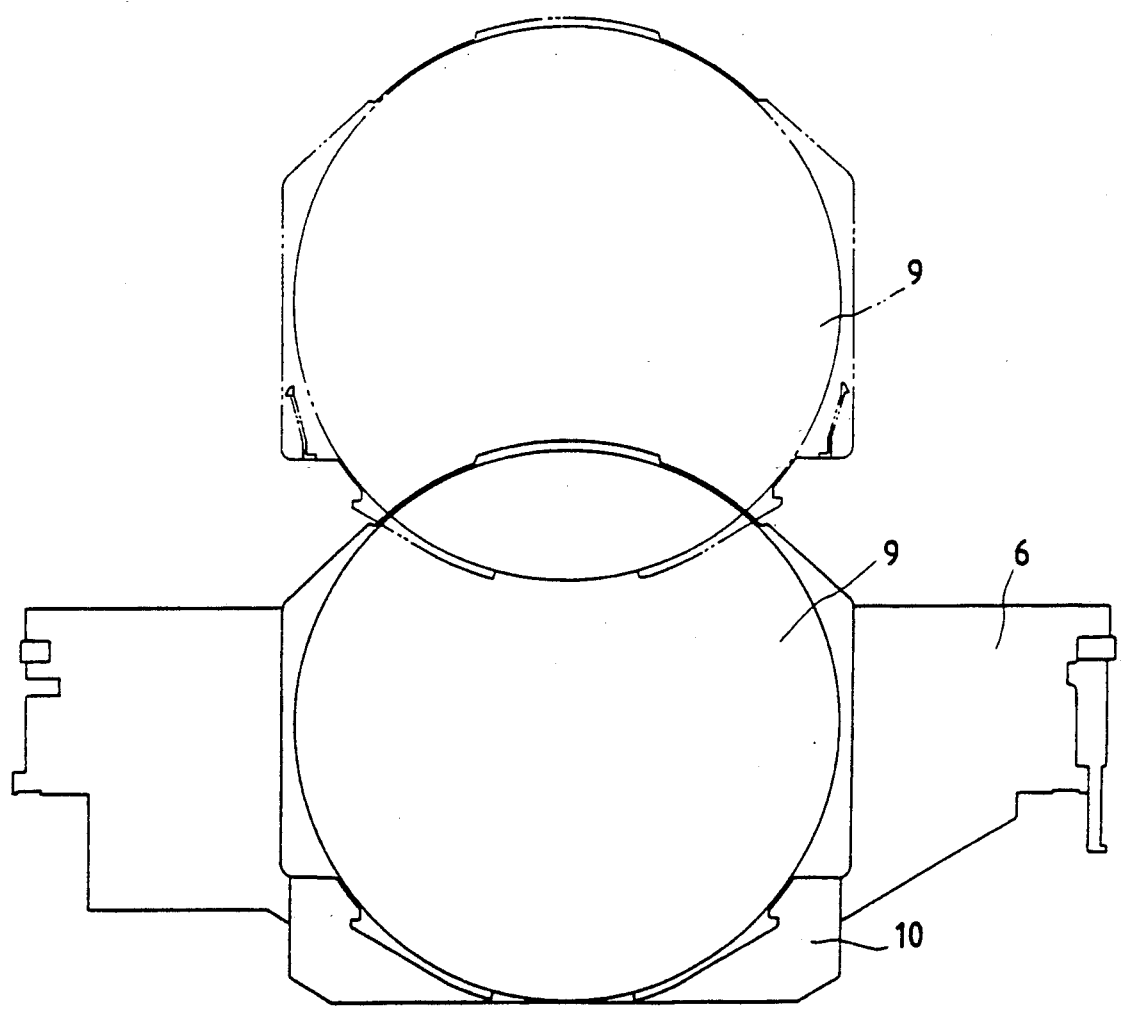

The tray 9 is now described in detail with reference to FIG. 4. The tray 9 has such a size that the disk D of 30 cm in diameter, for example, is contained in the tray. The tray 9 is made from a steel plate of enough rigidity, which is punched to have only a plurality of slender portions to decrease the weight of the tray. The central slender portions 9a and peripheral slender portions 9b of the tray 9 are integrally formed with protective portions 9c and 9d which are located in prescribed positions and made of a synthetic resin to prevent the disk D from coming into contact with the steel body of the tray so as to be scratched or damaged. The protective portions 9d on the peripheral slender portions 9b have vertical projections for guiding the disk D, and are formed with projections 9e in mutually opposite positions so that the projections are inserted into the tray guide 8 or 8'. The peripheral slender portions 9b are also formed with elastic engagement lugs 9f, which are engaged with the projections 8a of the tray 8 or 8'. The projective portions 9d on the peripheral slender portions 9b are formed with hooks 9g, which are engaged with the engagement arms 10k of the tray transfer means 10. The tray 9 includes a window or opening 9h through which a laser beam from a pickup passes during playback of the disk D. The window 9h extends radially outwardly from an interior of the tray 9.

A mechanism for pulling out the tray 9 from the tray guide 8 or 8' and then setting the tray in the disk player 11 or 11' and for pulling out the tray from the player and returning the tray to the tray guide is described in detail with reference to FIGS. 2, 3, 5, 6, 7, 8, 9, 10, 11, 12, 13 and 14 from now on. Two gears 6f and 6f', to the bottoms of which swing arms 6g and 6g' are secured, are supported under the moving rest 6 and engaged with the smaller gear of a double gear unit 6h whose larger gear is engaged with a worm 6j, which is rotated by a motor 6i secured to the bottom of the moving rest. When the motor 6i is driven, the gears 6f and 6f' are rotated in the same direction as each other through the worm 6j and the double gear unit 6h. The top of the moving rest 6 has an annular recess 6k between a pair of projections 6l and 6l'. A rotary circular plate unit 12 consists of two circular plates integrally and eccentrically conjoined to each other and having annular projections 12a and 12b on the obverse sides of the plates so that the annular projection 12a is fitted in the annular recess 6k of the moving rest 6 and the other annular projection 12b is fitted in the annular recess 13a of the bottom of a swing plate 13 described hereinafter. The circular plate having the annular projection 12a fitted in the annular recess 6k of the top of the moving rest 6 is rotatably coupled, a screw 14b, to the pivot 14a of a swing member 14, which is inserted into the center hole 6m of the moving rest from under it. The swing plate 13, in the annular recess 13a of which the annular projection 12b of the top of the rotary circular plate unit 12 is fitted, is secured thereto by a screw 13b inserted into the swing plate from over it. The swing plate 13 has guide grooves 13c and 13c' in the right and left portions of the bottom thereof. The projections 6l and 6l' of the moving rest 6 are optionally inserted into the guide grooves 13c and 13c' so that the rest is guided by the grooves. The swing plate 13 is provided with a pair of guide bars 13d extending in parallel with each other on the top of the plate. A retainer 12c is provided between the moving rest 6 and the rotary circular plate unit 12 along the annular projection 12a thereof. Another retainer 12c is provided between the swing plate 13 and the rotary circular plate unit 12 along the annular projection 12b thereof. Balls 12d are fitted in the holes of the retainers 12c. The swing member 14, whose pivot 14a is secured to the rotary circular plate unit 12 by the screw 14b, has a notch 14d near the pivot, and a pair of guide grooves 14c' extending in mutually different directions from the notch. Rollers $6g_1$ and $6g'$, provided on the swing arm 6g and 6g' at the tips thereof are optionally inserted into the guide grooves 14c and 14c' so that the rollers are guided. The pivot 14a is formed with a flange 14e extending by about 180 degrees in angle along the circumference of the pivot. Three switches $S_1$, $S_2$ and $S_3$ are disposed at angular intervals of about 90 degrees each so that the switches are turned on when they come into contact with flange 14e.

The tray transfer means 10 is provided on the top of a moving plate 15, which is moved backward and forward while being guided by the guide bars 13d of the swing plate 13. The tray transfer means 10 includes a motor 10a, a worm 10b, a pair of gears 10c, two pulleys 10d, belts 10e, a pair of large pulleys 10f, swing arms 10g, a pair of control arms 10h, a moving arm 10i, moving members 10j, the engagement arms 10k, return arms 10l, wound springs 10m, and rods 10n. The motor 10a is secured to the moving plate 15. The worm 10b has two spiral grooves, and is rotated by the motor 10a. The gears 10c are engaged with the worm 10b at both the sides thereof. The belts 10e are wound on pulleys formed on the gears 10c, the pulleys 10d and the large pulleys 10f so that the gears are connected to the large pulleys. The swing arms 10g are secured to the large pulleys 10f. Each of the control arms 10h are supported at one end thereof by the moving plate 15. Rollers 10g, on the swing arms 10g are fitted in slender holes 10h, slenderly extending in the control arms 10h in the longitudinal directions thereof. One end of the moving arm 10i is swung, under the moving plate 15, together with one of the control arms 10h. The other end of the moving arm 10i is engaged with the projection 13e of the swing plate 13. The moving member 10j is engaged with the tips of the control arms 10h, and guided by two pairs of guide bars 15a provided on the right and left portions of the moving plate 15. The engagement arms 10k and the return arms 10l are rotatably supported by pins 10j, planted in the moving members 10j. The left-hand engagement arm 10k and the left-hand return arm 10l are urged clockwise by one of the wound springs 10m, while the right-hand engagement arm 10k and the right-hand return arm 10l are urged counterclockwise by the other of the springs. The rods 10n are supported by the moving members 10j slidably relative thereto, and are urged by springs 10n' in such directions as to move the moving members 10j forward. Projections 10k' provided on the tops of the engagement arms 10k are engaged with projections 10l' provided on the bottoms of the return arms 10l. Projections 10l" provided on the bottoms of the return arms 10l are engaged with the front ends of the rods 10n. Since the projections 10l'' of the return arms 10l are in contact with the front ends of the rods 10n and the projections 10k' of the engagement arms 10k are in contact with the projections 10l' of the return arms 10l, the swinging forces of the wound springs 10m are controlled so that the tray transfer means 10 is put in a state shown in FIG. 7. Disengaging pins 10o for disengaging the elastic engagement lugs 9f of the tray 9 from the projections 8a of the tray guide 8 or 8' when the pins come into contact with the lugs project from the moving members 10j so that the tips of the pins are located behind those of the rods 10n. Guide grooves 15b for guiding the tray 9 are provided in the moving plate 15 along both the side edges thereof. Restrictors 15c, which are freely turnable backward but not turnable forward, are attached to the top of the moving plate and located in the rear half portions of the guide grooves 15b so that the restrictors are engaged with the return arms 10l when the tray 9 is returned to the tray guide 8 or 8' provided in the case 1.

Transferring the tray 9 is described in detail from now on. Before the transferring of the tray 9 is started, the automatic disk changer is in a state shown in FIG. 5. In that state, the rollers $6_{g1}$ and $6_{g1}$, on the swing arms 6g and 6g, remain inserted in the guide grooves 14c and 14c' of the swing member 14 in the central position thereof, the projections 6l and 6l' provided on the moving rest 6 remain inserted, in the guide grooves 13c and 13c' provided in the bottom of the swing plate 13, and the switch $S_2$ remains turned on by the flange 14e. When electric power is then applied to the motor 6i so that the gears 6f and 6f' are rotated clockwise with regard to FIG. 6, the swing arm 6g remains inserted in the guide groove 14c of the swing member and the other swing arm 6g' is moved out from the guide groove 14c of the swing member so that the member is swung clockwise by the swing arm 6g. At that time, the projection 6l remains inserted in the guide groove 13c, and the other projection 6l' is moved out from the guide groove 13c'. As a result, the swing plate 13 is swung clockwise on the rotary circular plate unit 12 relative to the moving rest 6 about the engaged portions of the projection 6l and the guide groove 13c. When the swing member 14 is swung by an angle of about 90 degrees so that the switch $S_3$ is turned on by the flange 14e, the application of the electric power to the motor 6i is ceased so that the swing plate 13 is stopped in a swung position shown in FIG. 6. If the gears 6f and 6f' are rotated counterclockwise with regard to FIG. 6 by the reverse rotation of the motor 6i, the swing member 14 is swung counterclockwise so that the swing plate 13 is swung clockwise about the engaged portions of the projection 6l' and the guide groove 13c'. When the swing plate 13 is thus swung counterclockwise or clockwise, the plate is opposed to the tray 9 inserted in the tray guide 8 or 8' in the case 1.

When the switch $S_3$ is turned on so that the swing plate 13 is stopped as mentioned above, electric power is applied to the motor 10a so that the double-grooved worm 10b is rotated. As a result, the gears 10c are rotated so that the large pulleys 10f are rotated, in directions shown in FIG. 7, by the belts 10e wound on the pulleys formed on the gears 10c. The worm 10b is provided with the two spiral grooves so that the gears 10c engaged with the worm are rotated synchronously with each other. Since the large pulleys 10f are thus rotated, the swing arms 10g secured thereto are swung in the same directions as the rotation of the pulleys so that the pair of control arms 10h and the moving arm 10i are swung. When the moving arm 10i is swung counterclockwise with regard to FIG. 7, the moving plate 15 is moved backward to the vicinity of the tray 9 inserted in the tray guide 8 or 8' in the case 1, while being guided by the guide bars 13d, because the tip of the moving arm is engaged with the projection 13e of the swing plate 13. When the pair of control arms 10h are swung in the same direction as the swing arm 10g, the moving members 10j engaged with the tips of the control arms 10h are moved backward while being guided by the guide bars 15a. The end of the backward movement is shown in FIG. 9. Immediately before the end of the backward movement of the moving members 10j, the disengaging pins 10o come into contact with the elastic engagement lugs 9f of the tray 9 to disengage the lugs from the projections 8a of the tray guide 8 or 8', and the rods 10n come into contact with the projections 9e of the tray 9 and move forward against the forces of the springs 10n' to swing the return arms 10l against the forces of the wound springs 10m. At that time, the engagement arms 10k once come into contact with the hooks 9g of the tray 9 and are then swung against the forces of the wound springs 10m and thereafter engaged with the hooks as shown in FIG. 9.

After the completion of the backward movement of the moving members 10j is detected by a switch not shown in the drawings, the motor 10a is once stopped and then rotated in reverse so that the moving plate 15 and the moving members 10j are moved forward. At the time of the forward movement of the moving members 10j, the engagement arms 10k are already engaged with the hooks 9g of the tray 9, and the elastic engagement lugs 9f of the tray are already disengaged from the projections 8a of the tray guide 8 or 8' by the disengaging pins 10o having come into contact with the lugs. For that reason, the moving plate 15 and the moving members 10j are moved forward to the original positions thereof as shown in FIGS. 10 and 12, while pulling out the tray 9 from the tray guide 8 or 8' into the guide grooves 15b of the moving plate. Although the return arms 10l come into contact with the restrictors 15c in the guide grooves 15b of the moving plate 15 during the forward movement of the moving members 10j, the return arms pass by the restrictors while turning them forward, because the restrictors are turnable forward as mentioned above.

Figure 19:
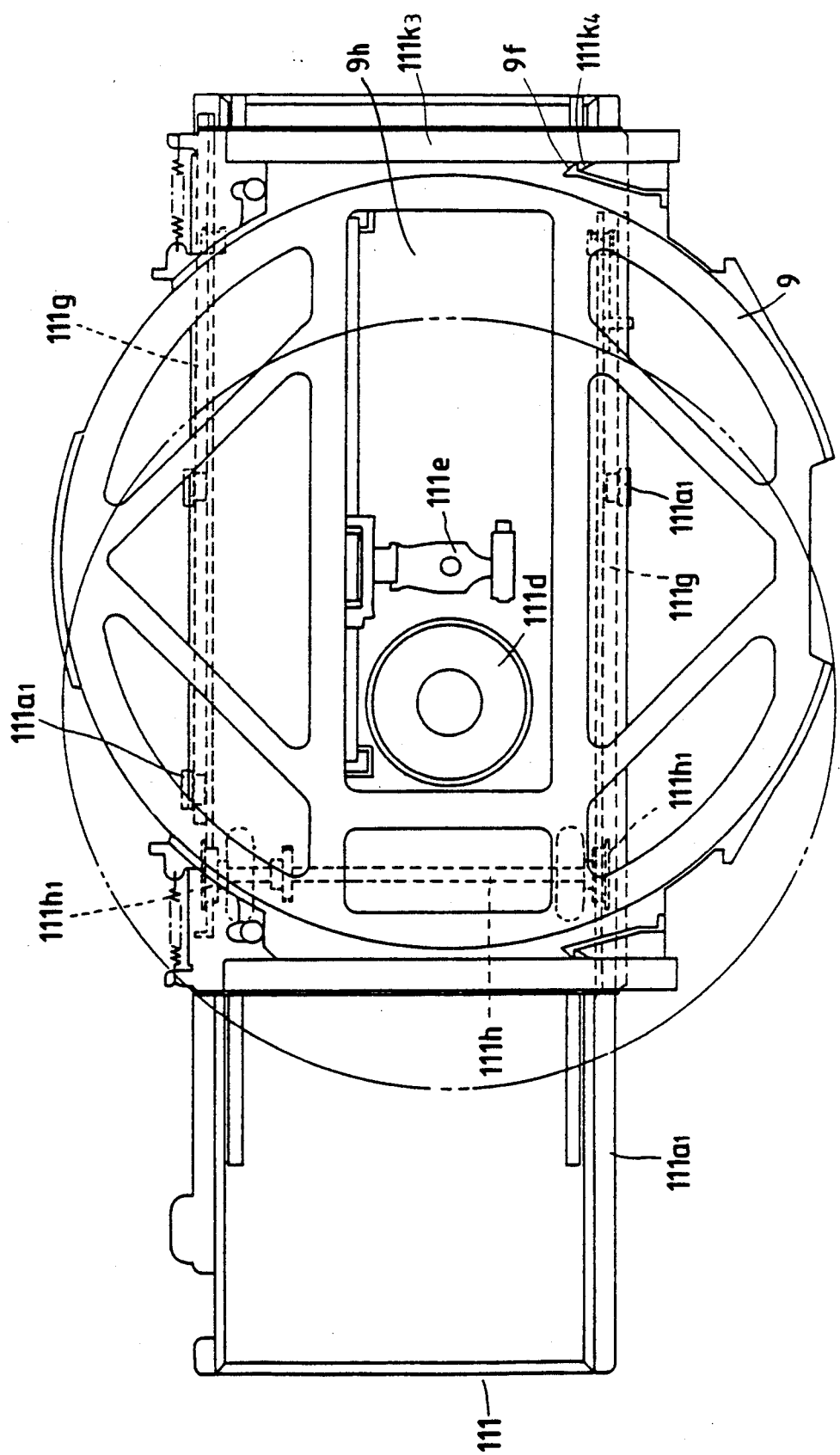
FIG. 19 is a plan view of the player unit fitted with the tray moving frame in a moved state.

While the forward movement of the moving plate 15 and the moving members 10j to the original positions thereof is completed, the switch not shown in the drawings acts to cease the rotation of the motor 10a and apply electric power to the motor 6i so that an operation reverse to that described above is performed to return the swing plate 13 to a neutral position shown in FIG. 5. When the switch $S_2$ is then turned on, the application of the electric power to the motor 6i is ceased so that the rotation of the motor is stopped. At that time, electric power is applied to the motor 10a again so that the moving plate 15 and the moving members 10j are moved backward. Because of the backward movement of the moving members 10j, the tray 9 is moved backward while being pulled out from the guide grooves 15b of the moving plate 15 and inserted into the guide grooves $111k_3$ (FIG. 19) of the disk player 11 or 11' described hereinafter. Immediately before the end of the backward movement of the moving members 10j, the return arms 10l come into contact with the restrictors 15c as shown in FIG. 11. Since the restrictors 15c are not turnable backward, the return arms 10*l* are swung against the forces of the wound springs 10*m* so that the projections 10*k'* of the engage-arms 10*k* engaged with the projections 10*l'* of the return arms are pulled. As a result, the engagement arms 10*k* are also swung against the forces of the would springs 10*m* in the same directions as the return arms 10*l* so that the engagement arms are disengaged from the hooks 9*g* of the tray 9. After the disengagement, the tray 9 is pushed in to the ends of the guide grooves 111*k*$_3$ by the rods 10*n* urged by the springs 10*n'*. When the backward movement of the moving plate 15 and the moving members 10*j* to the ends of the strokes thereof is completed, the application of the electric power to the motor 10*a* is ceased so that the movement is stopped, in the same manner as that described above, in a state shown in FIGS. 11 and 13. After the stoppage of the movement, the motor 10*a* is rotated in reverse so that the moving plate 15 and the moving members 10*j* are moved forward. Since the disengaging pins 10*o* are put out of contact with the elastic engagement lugs 9*f* because of the forward movements of the moving members 10*j*, as shown in FIG. 19 the lugs are engaged with hooks 111*k*$_4$ provided at the guide groove 111*k*$_3$ of the disk player 11 or 11' and the rods 10*n* continue to push the tray 9 by the forces of the springs 10*n'*. As a result, the tray 9 is set in the disk player 11 or 11'.

After the disk D in the tray 9 is played by the disk player 11 or 11', the tray is returned to the tray transfer means 10 by an operation similar to that of taking out the tray from the 8 or 8'. The tray 9 returned to the tray transfer means 10 is moved back to the tray guide 8 or 8' by an operation reverse to that of transferring the tray to the disk player 11 or 11'.

Figure 14:
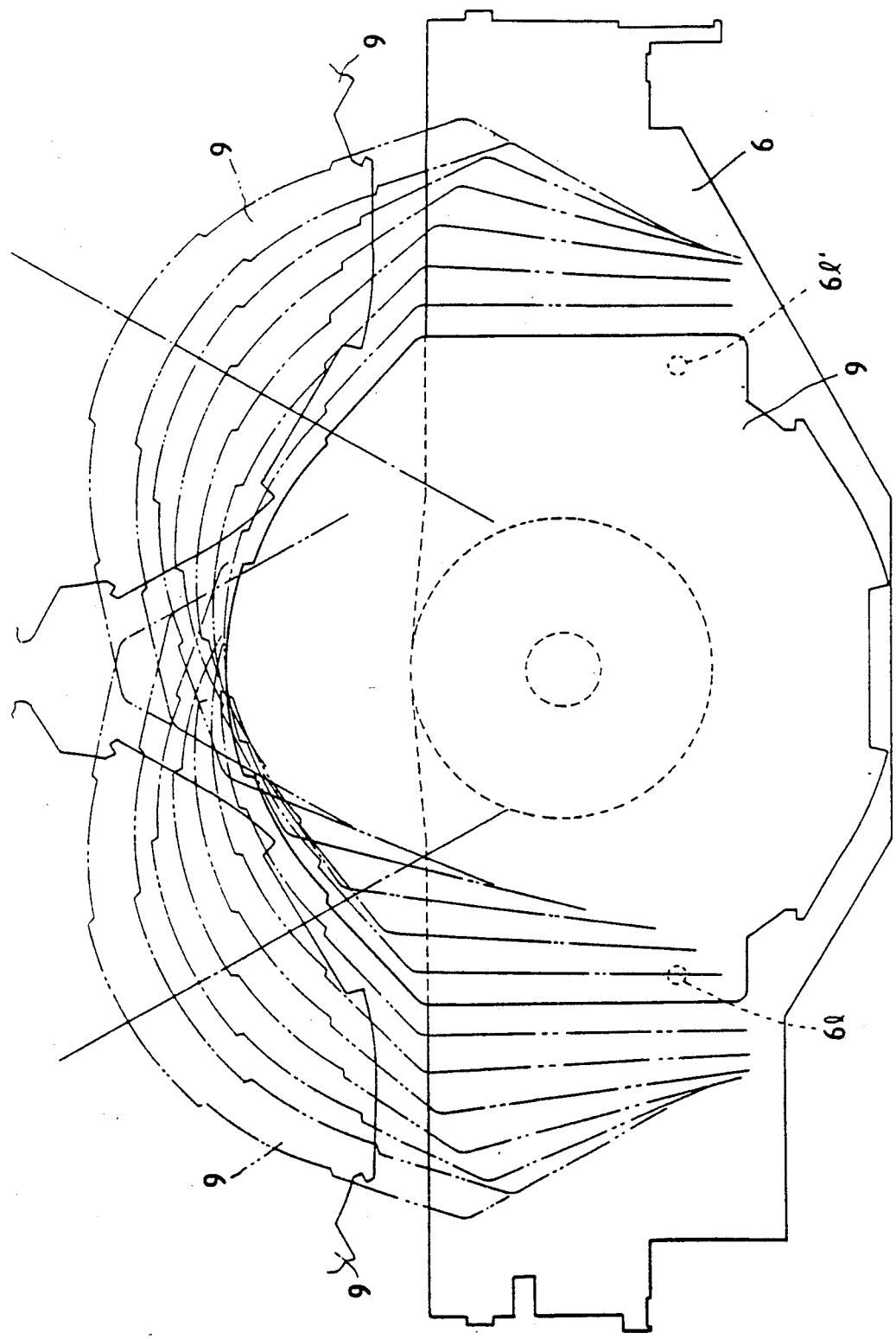
Figure 15:
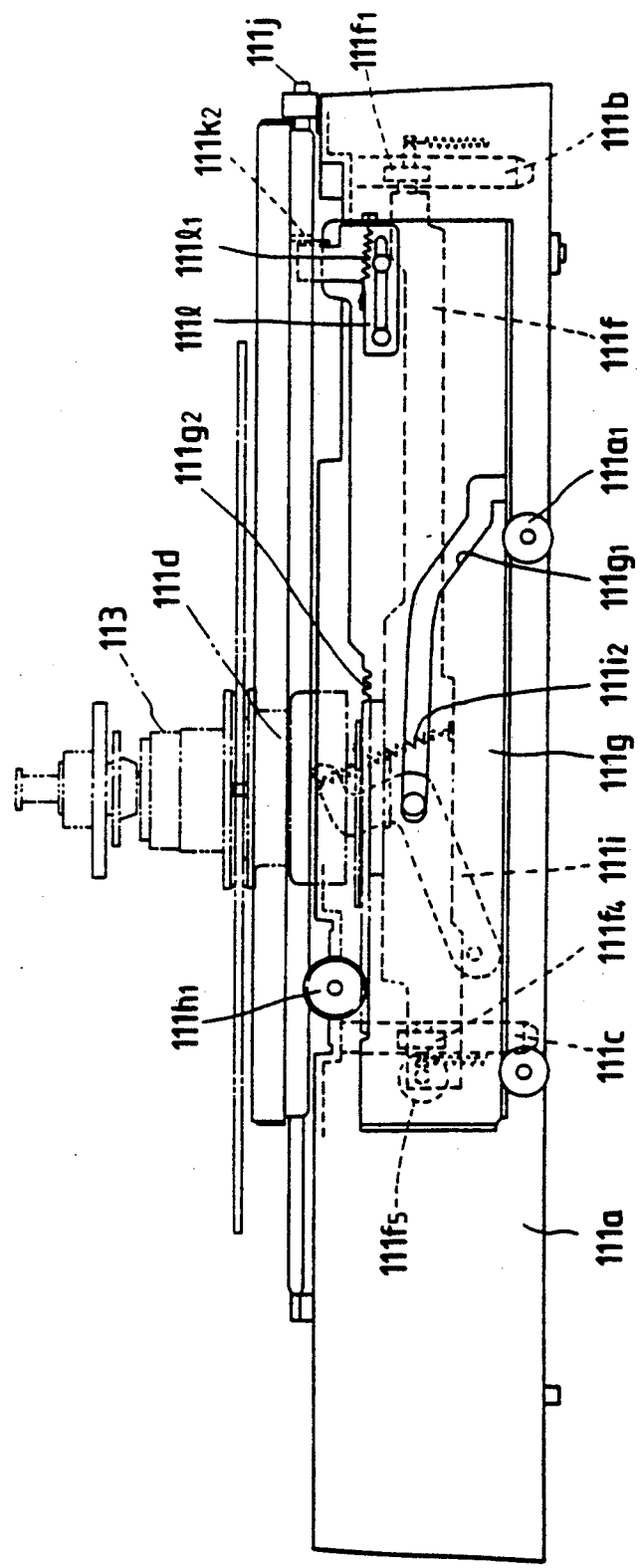
FIG. 15 is a front view of a lower disk player unit.

FIG. 14 is a plan view of the tray 9 being transferred.

Figure 16:
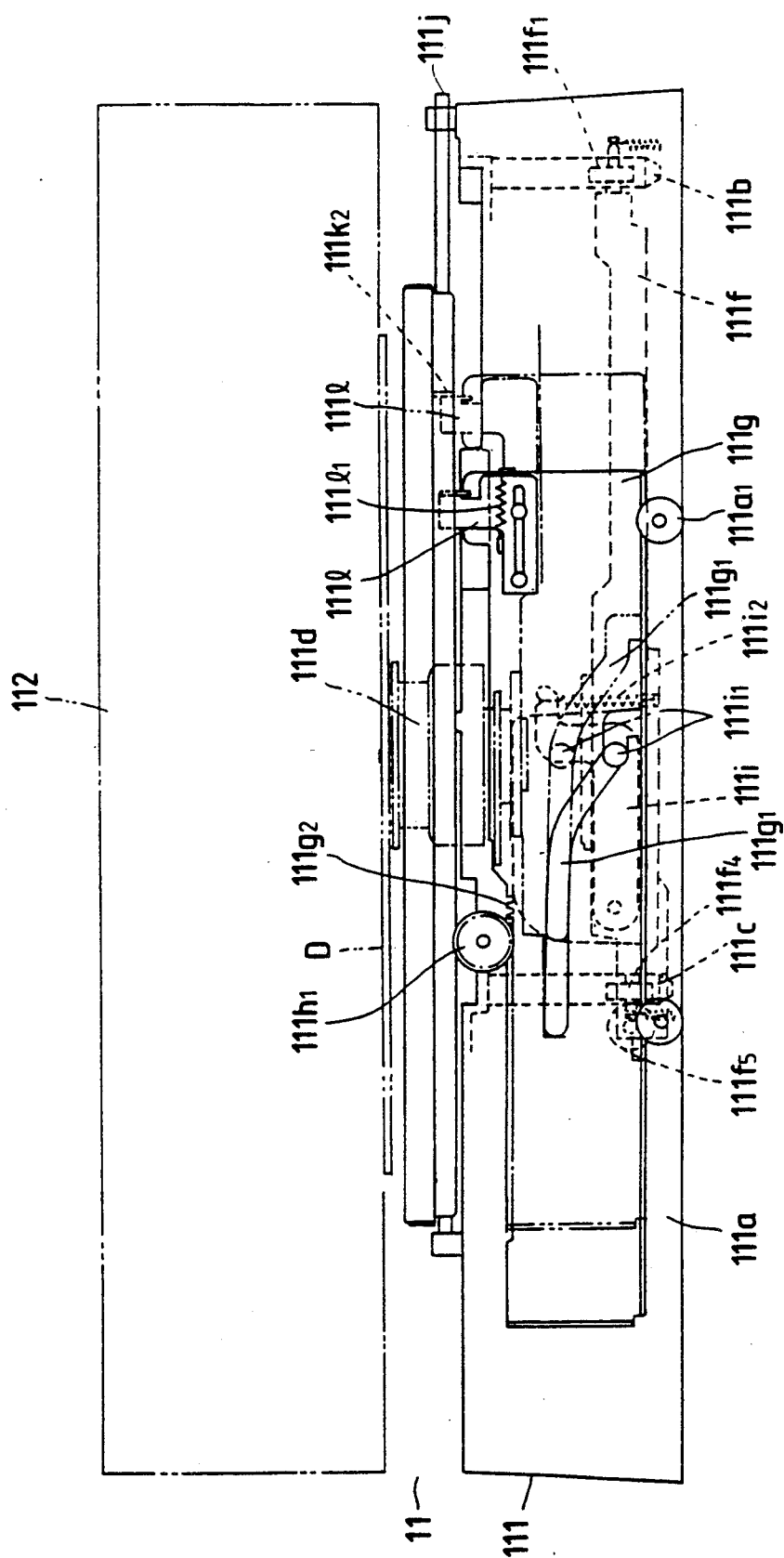
FIG. 16 is a front view of the player unit in a moved state.
Figure 17:
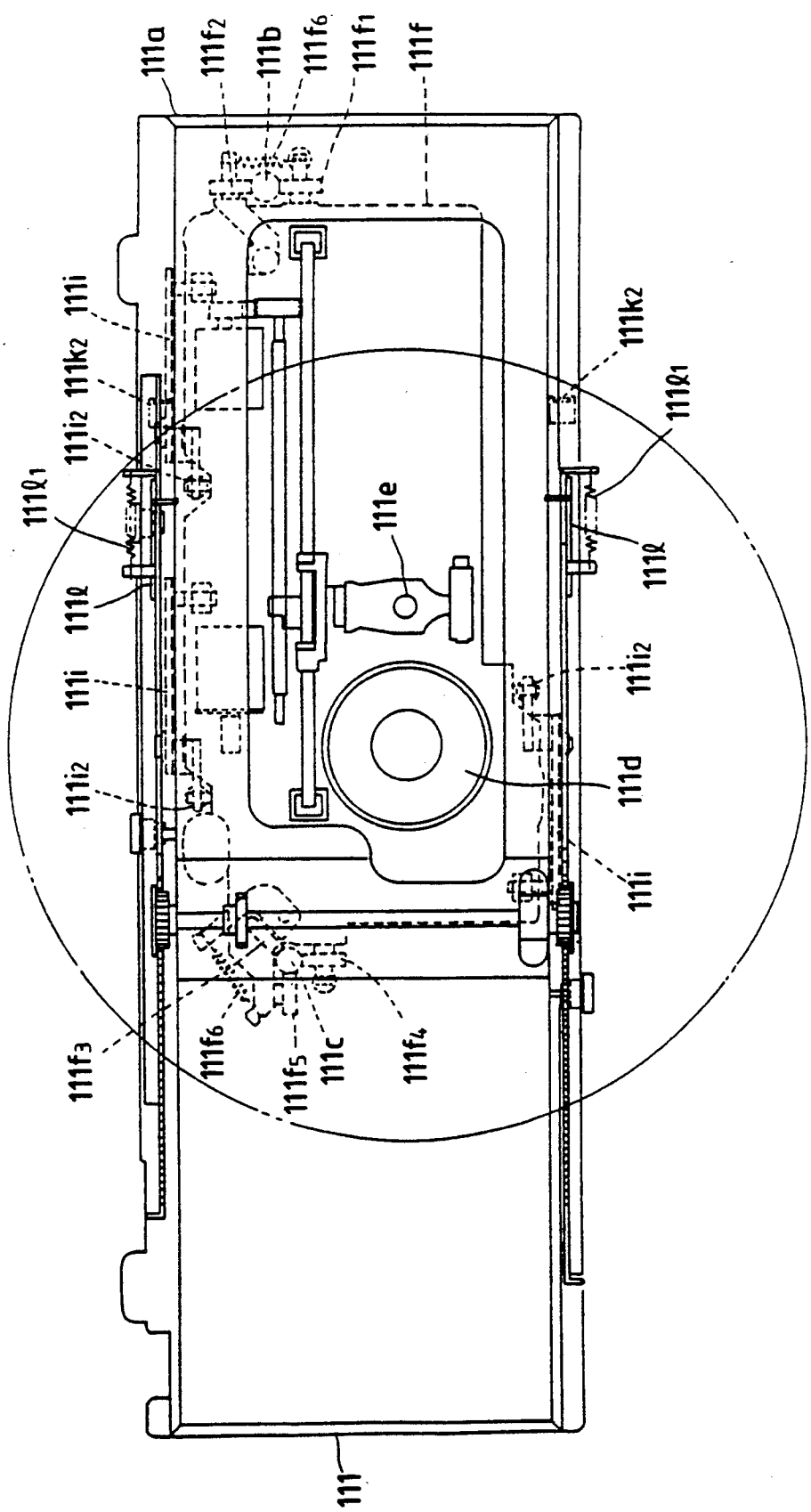
FIG. 17 is a plan view of the player unit.
Figure 18:
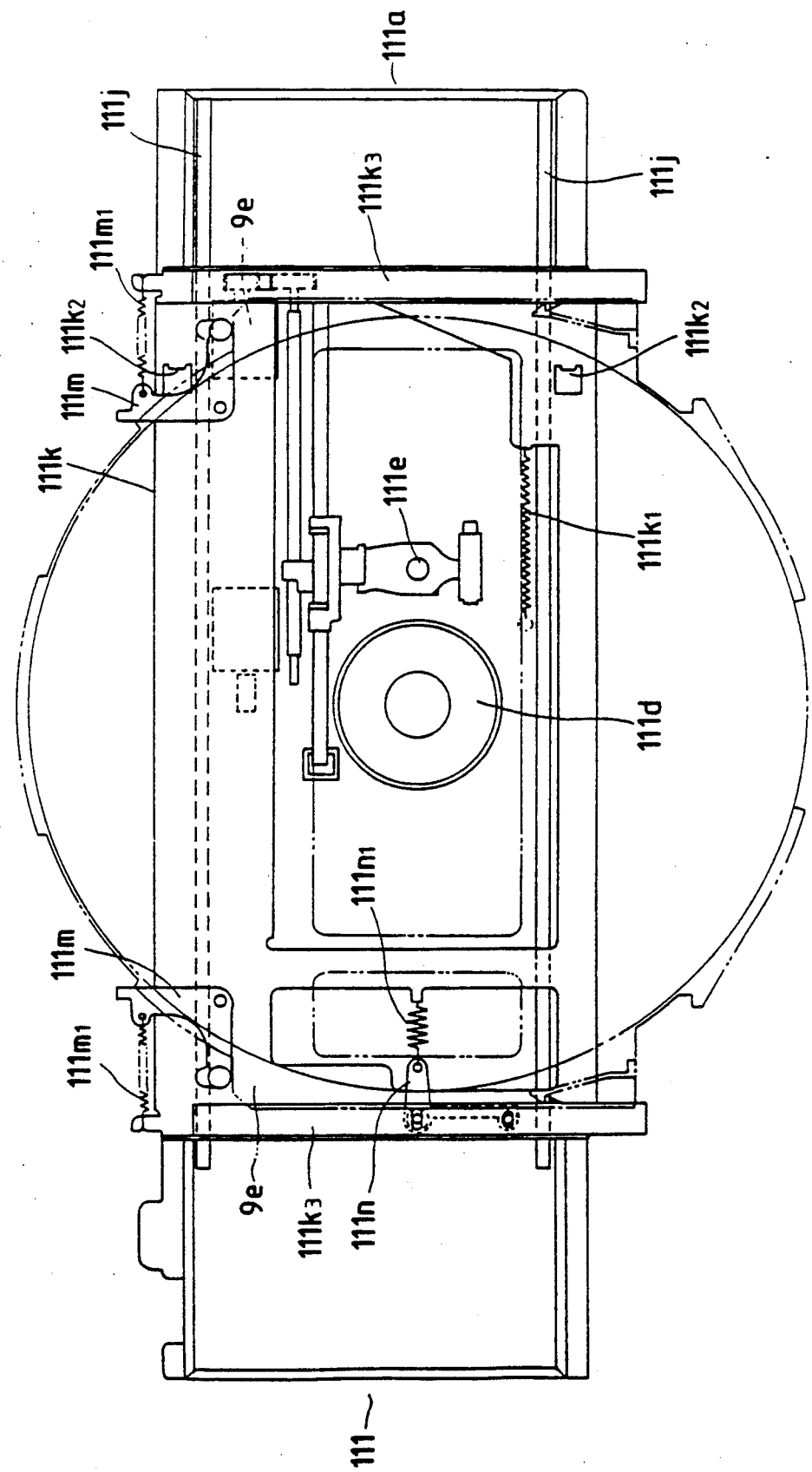
FIG. 18 is a plan view of the player unit fitted with a tray moving frame.

The constitution of the disk players 11 and 11' installed in the case 1 at the upper and lower portions thereof is described with reference to FIGS. 15, 16, 17, 18, 19, 20, 21, 22, 23, 24, 25 and 26 from now on. Since the disk players 11 and 11' are the same as each other in constitution, the constitution of only the upper disk player 11 is described herein. The disk player 11 includes pickups 111*e* which are located over and under the disk D to read recorded information from both the sides of the disk while the disk is supported by a turntable unit and a clamper. The disk player 11 is composed of an upper and a lower disk player units 112 and 111 dispose at a prescribed distance from each other as shown in FIG. 16.

The constitution of the lower disk player unit 111 is first described in detail with reference to FIGS. 15, 16, 17, 18 and 19 The lower disk player unit 111 includes a box 111*a*, support shafts 111*b* and 111*c*, the conventional turntable unit 111*d*, the pickup 111*e*, a pickup base 111*f*, sliding plates 111*g*, a rotary shaft 111*h*, swing arms 111*i*, guide bars 111*j*, a tray moving frame 111*k*, moving plates 111*l*, a pair of L-shaped pushout swing plates 111*m*, and an L-shaped push plate 111*n*. The box 111*a* is secured to the case 1. The support shafts 111*b* and 111*c* extend from the box 111*a*. The pickup base 111*f* is fitted with the pickup 111*e*, which is horizontally moved to read recorded information from the disk D pinch-held by the turntable unit 111*d* and the clamper described hereinafter. The pickup base 111*f* is also fitted with a fixed roller 111*f* and a displaceable roller 111*f* at one end of the base. The fixed roller 111*f*$_1$ is disposed in contact with the support shaft 111*b*. The displaceable roller 111*f*$_2$ is disposed in elastic contact with the support shaft 111*b* by a spring 111*f*$_6$. The pickup base 111*f* is furthermore fitted with two fixed rollers 111*f*$_4$ and 111*f*$_5$ and a displaceable roller 111*f*$_3$ at the other end of the base. The fixed rollers 111*f*$_4$ and 111*f*$_5$ are disposed in contact with the support shaft 111*c*. The displaceable roller 111*f*$_3$ is disposed in elastic contact with the support shaft 111*c* by a spring 111*f*$_6$. As a result, the pickup base 111*f* is supported by the rollers 111*f*$_1$, 111*f*$_2$, 111*f*$_3$, 111*f*$_4$ and 111*f*$_5$ so that the base can be only moved up and down. The sliding plates 111*g* are slidably supported by rollers 111*a*$_1$ provided at the front and rear of the box 111*a*. The sliding plate 111*g* at the front of the box 111*a* has a guide hole 111*g*$_1$ curved with an obtuse angle. The other sliding plate 111*g* at the rear of the box 111*a* has two guide holes each curved with an obtuse angle but not shown in the drawings. The sliding plates 111*g* are formed with racks 111*g*$_2$ at portions of the upper edges of the plates. The racks 111*g*$_2$ are engaged with gears 111*h*$_1$ secured to both the ends of the rotary shaft 111*h*, which is rotated by a motor not shown in the drawings. When the motor is driven so that the gears 111*h*$_1$ are rotated, the sliding plates 111*g* are moved leftward with regard to FIG. 16. The pickup base 111*f* is fitted with the swing arms 111*i* each supported at one end thereof. Pins 111*i*$_1$ project from the nearly central portions of the swing arms 111*i* and are inserted into the guide holes 111*g*$_1$ of the sliding plates 111*g*. A spring 111*i*$_2$ is anchored in a tensile manner to the tip of each of the swing arms 111*i* and the pickup base 111*f*. When the sliding plates 111*g* are moved rightward with regard to FIG. 16 as mentioned above, the swing arms 111*i* are moved upward as in FIG. 15 so that the pickup base 111*f* is lifted by the forces of the springs 111*i*$_2$. As a result, the turntable unit 111*d* moves up the disk D in the tray 9. The guide bars 111*j* are disposed at the front and rear upper edges of the box 111*a* so as to guide the tray moving frame 111*k* when it is moved. A spring 111*k*$_1$ is anchored in a tensile manner to the tray moving frame 111*k* and the box 111*a* and always urges the frame leftward with regard to FIGS. 18 and 19. Vertical lugs 111*k*$_2$ extend down from the bottoms of the front and rear of the tray moving frame 111*k* and are in contact with the moving plates 111*l* which are coupled to the sliding plates 111*g* so that the moving plates are horizontally movable. A spring 111*l*$_1$ is anchored in a tensile manner to each sliding plate 111*g* and the corresponding moving plate 111*l* and always urges the moving plate rightward with regard to FIG. 17. While the sliding plates 111*g* are moved from positions shown by full lines in FIG. 16 to other positions shown by dotted lines therein, the pickup base 111*f* is lifted so that the turntable unit 111*d* moves up the disk D in the tray 9. When the sliding plates 111*g* have reached the positions shown by the dotted lines in FIG. 16, the tips of the moving plates 111*l* come into contact with the vertical lugs 111*k*$_2$ of the tray moving frame 111*k*. When the sliding plates 111*g* are then moved to positions shown in FIG. 15, the tray moving frame 111*k* is moved against the force of the spring 111*k*$_1$ so that the frame is stopped at the end of the box 111*a* as shown in FIG. 19. The excess movement of each sliding plate 111*g* is absorbed by the spring 111*k*$_1$. As a result, the peripheral edge of the tray 9 is not located in the range of the movement of the pickup 111*e*. For that reason, the tray can be nearly equalized to the disk D in size. Tray guides 111*k*$_3$ similar to the tray guides 8 and 8' attached to the body of the case 1 are secured to the right and left sides of the tray moving frame 111*k* so that the tray 9 brought by the tray transfer means 10 is inserted into the tray guides 111$k_3$. The tray guides 111$k_3$ are formed with projections 111$k_4$, which are engaged with the elastic engagement lugs 9$f$ of the tray 9. The pair of L-shaped push-out swing plates 111$m$ are attached to the tray moving frame 111$k$ at the rear thereof near both the sides thereof so that the plates are swingable. A spring 111$m_1$ is anchored in a tensile manner to the tray moving frame 111$k$ and one end of each push-out swing plate 111$m$ whose other end is in contact with the tip of the projection 9$e$ of the tray 9. The swing plate 111$m$ is always urged by the spring 111$m_1$ in such a direction as to put out the tray 9. The L-shaped push plate 111$n$ is attached to the tray moving frame 111$k$. One end of the plate 111$n$ is inserted in the tray guide 111$k_3$. A spring 111$n_1$ is anchored in a tensile manner to the other end of the push plate 111$n$ and the tray moving frame 111$k$ so that the side of the projection 9$e$ of the tray 9 inserted in the tray guides 111$k_3$ is pushed by the push plate to prevent the tray from moving either rightward or leftward due to a clearance. For that reason, in the state that the tray 9 is inserted in the guide rails 111$k_3$ and the elastic engagement lugs 9$f$ of the tray are engaged with the projections 111$k_4$, the push plate 111$n$ pushes the side of the projection 9$e$ of the tray to prevent it from moving either rightward or leftward due to the clearance. When the elastic engagement lugs 9$f$ and the projections 111$k_4$ are disengaged from each other. The push-out swing plates 111$m$ push out the tray 9. When the lugs 9$f$ and the projections 111$k_4$ remain engaged with each other, the push-out swing plates 111$m$ prevent the tray 9 from moving either forward or backward due to a clearance.

Figure 20:
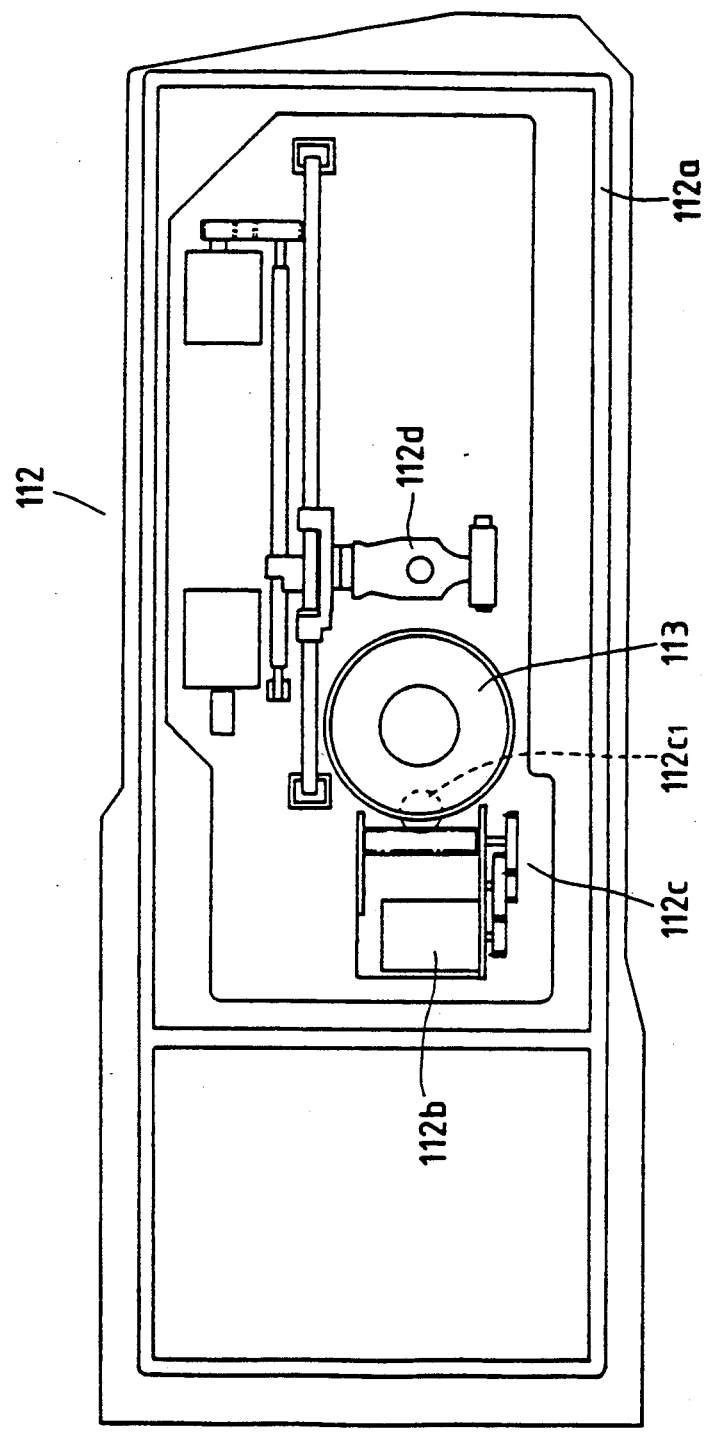
FIG. 20 is a bottom view of an upper disk player unit.
Figure 21:
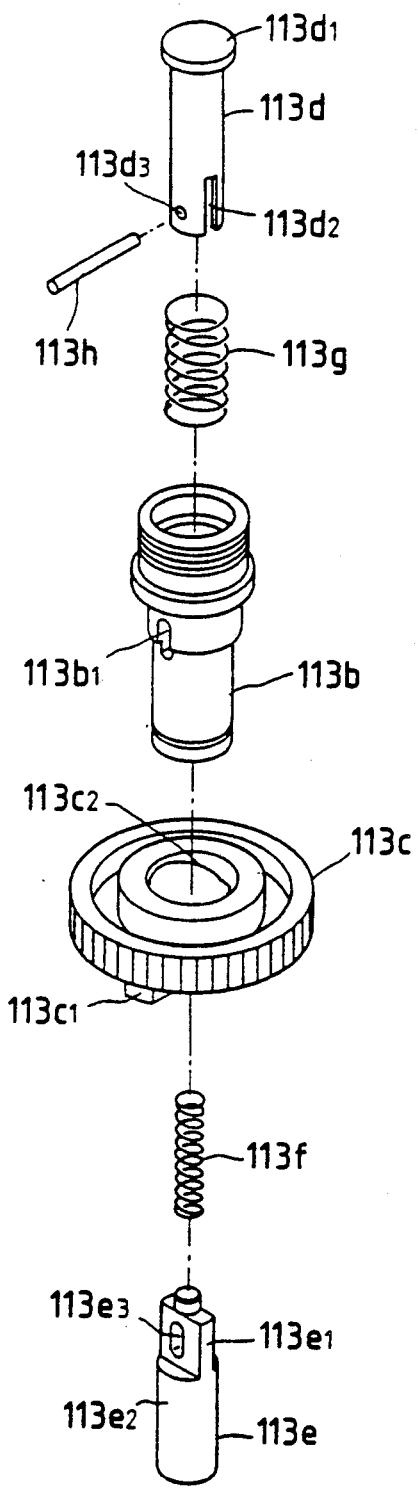
FIG. 21 is a perspective exploded view of a part of a clamper at the upper disk player unit.

The constitution of the upper disk player unit 112 is now described with reference to FIG. 20. The upper disk player unit 112 includes a box 112$a$, a motor 112$b$, a speed reduction gear train 112$c$, the pickup 112$d$ supported to be horizontally movable, and the clamper 13 supported in the box 12$a$ so that the clamper can be moved up and down by the motor 112$b$ and the speed reduction gear train 112$c$. The pickup 112$d$ functions to read recorded information from the disk D pinched by the clamper 113 and the turntable unit 111$d$ of the lower disk player unit 111. If the disk D is a video disk consisting of two circular plates conjoined to each other, the center hole of the lower circular plate is likely to be non-coincident with that of the upper circular plate so that the turntable unit 111$d$ is eccentric to the center hole of the upper circular plate of the disk centered by the turntable unit and pinched by the clamper 13 and the turntable unit. In the case of the eccentricity, the disk D rotates eccentrically to the upper pickup 112$d$ to make it difficult to properly track the disk. In order to avoid such difficulty, the disk D, from the upper circular plate of which recorded information is to be read by the pickup 112$d$, is centered by the clamper 113 and then pinched between the turntable unit 111$d$ and the clamper.

The clamper 113 is described in detail with reference to FIGS. 21, 22, 23, 24, 25 and 26. The clamper 113 includes a base 113$a$, a pipe 113$b$, a gear 113$c$, a hollow shaft 113$d$, a rod 113$e$, springs 113$f$ and 113$g$, a pin 113$h$, a support plate 113$i$, a spring 113$j$, a disk push plate 113$k$, a mounting plate 113$l$, and a position restricting plate 113$m$ for positioning the disk D. The base 113$a$ is secured to the box 112$a$ by an appropriate means. The pipe 113$b$ is secured in the central portion of the base 113$a$. The final gear 112$c_1$ of the speed reduction gear train 112$c$ is supported by the base 113$a$. The base 113$a$ is fitted with a switch 113$a_1$, with which operating pins 113$c_1$ provided at an angular interval of 180 degrees on the bottom of the peripheral portion of the gear 113$c$ supported by the pipe 113$b$ under the base 113$a$ and engaged with the final gear 112$c_1$ are alternately put into contact. The gear 113$c$ has a cam portion 113$c_2$ inside the operating pins 113$c_1$. The hollow shaft 113$d$ is formed with a spring engaging flange 113$d_1$ at the upper end of the shaft, and has notches 113$d_2$ extending at the lower end of the shaft and facing each other, and pin fitting holes 113$d_3$ facing each other and located at the lower end of the shaft at angular intervals of 90 degrees from the notches. The rod 1113$e$ has an upper flat portion 113$e_1$ inserted in the notches 113$d_2$ of the hollow shaft 113$d$, a lower round portion 113$e_2$, and a slendor hole 113$e_3$ provided in the upper flat portion. The spring 113$f$ is housed in the hollow shaft 113$d$. The hollow shaft 113$d$ and the spring 113$g$ are inserted down into the pipe 113$b$. The rod 113$e$ is inserted up into the pipe 113$b$ so that the upper flat portion of the rod is fitted in the notches 113$d_2$ of the pipe. The pin 113$h$ is then inserted into one of slender holes 113$b$ provided in the pipe 113$b$ and facing each other, so that the pin extends through the hollow shaft 113$d$, the slender hole 113$e_3$ of the rod 113$e$ and the other slender hole 113$b_1$ and projects at both the ends of the pin from the pipe 113$b$. As a result, the projecting ends of the pin 113$h$ are in contact with the cam portion 113$c_2$ of the gear 113$c$, the hollow shaft 113$d$ and the rod 113$e$ are coupled to each other by the pin, and the spring 113$f$ urges the rod in such a direction as to move the rod away from the shaft. The support plate 113$i$ is borne so that it can be moved up and down relative to the pipe 113$d$. The plate 113$i$ is always urged downward by the spring 113$j$. The disk push plate 113$k$ is rotatably supported with a bearing 113$i_1$ by the support plate 113$i$. The mounting plate 113$l$ is secured to the lower end of the rod 113$e$ by a screw. The position restricting plate 113$m$ is rotatably supported with a bearing 113$l_1$ by the mounting plate 113$l$. The peripheral portion 113$m_1$ of the position restricting plate 113$m$ is tapered to coincide with the center hole of the disk D. The central tubular portion 113$m_2$ of the position restricting plate 113$m$ projects down so that the center shaft 111$d_1$ of the turntable unit 111$d$ is inserted into the central tubular portion.

The body 111$d_3$ of the turntable unit 111$d$ is rotated by motor 111$d_2$ provided therein. A disk position restricting plate 111$d_5$ is attached to the central portion of the body 111$d_3$ and urged upward by a spring 111$d_4$.

Figure 22:
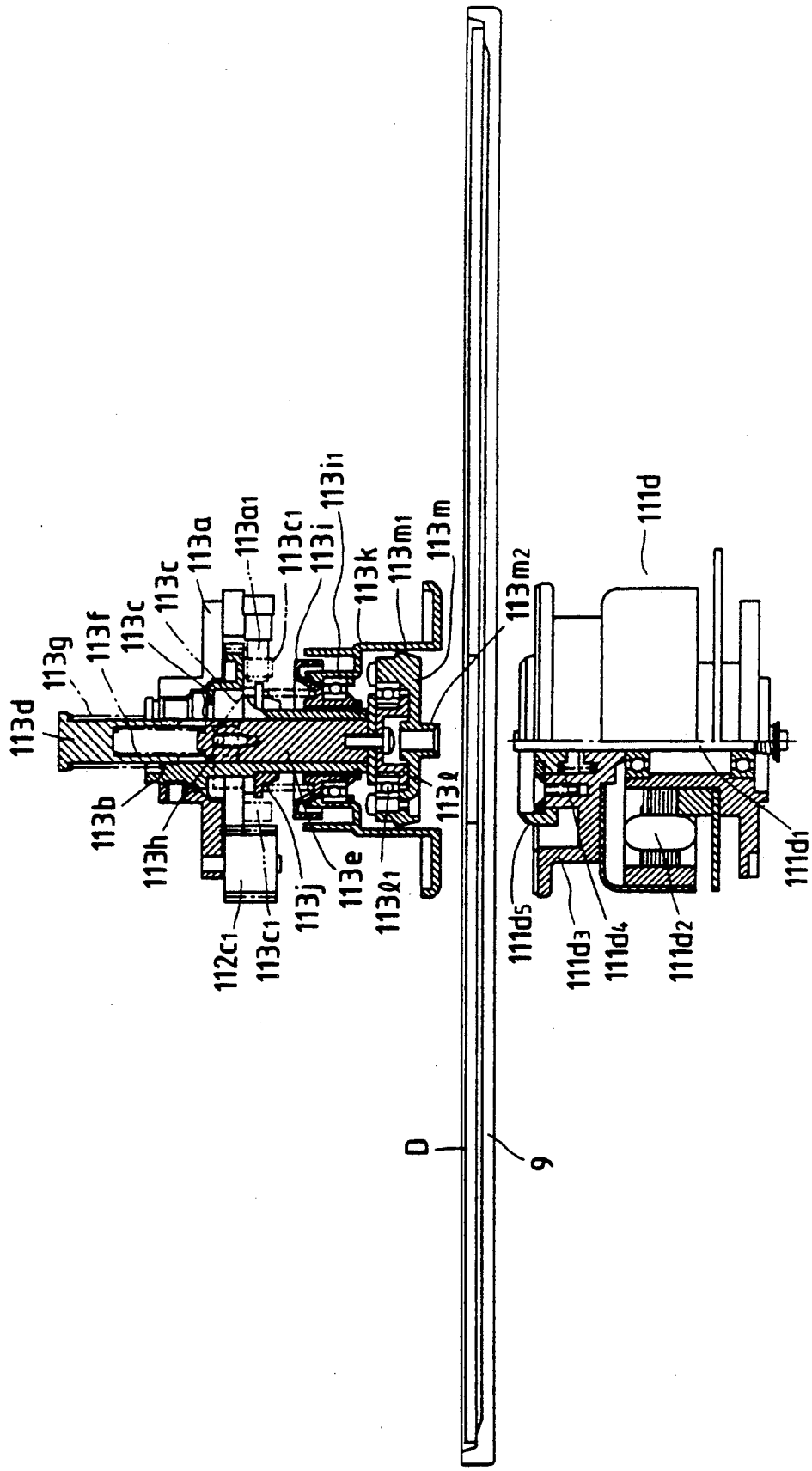
Figure 23:
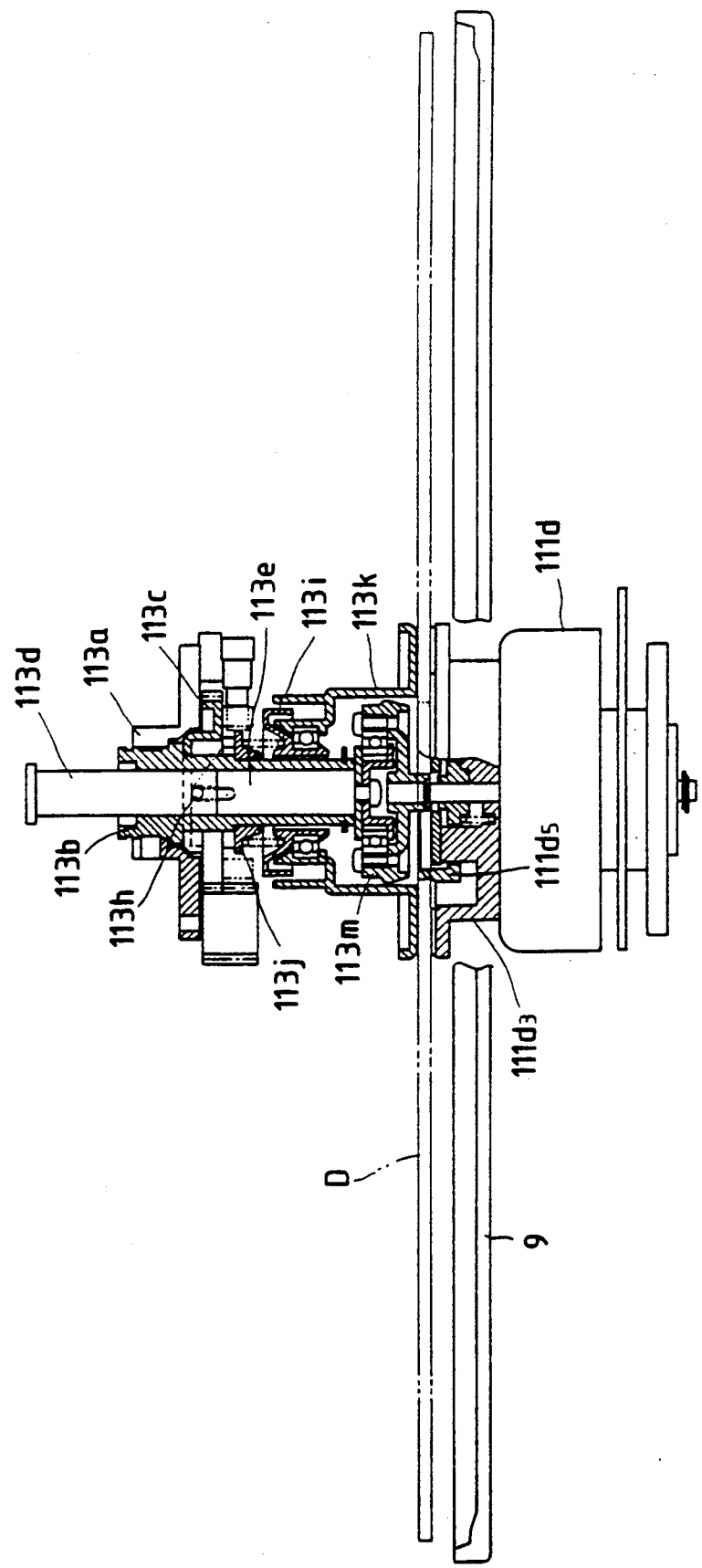
Figure 24:
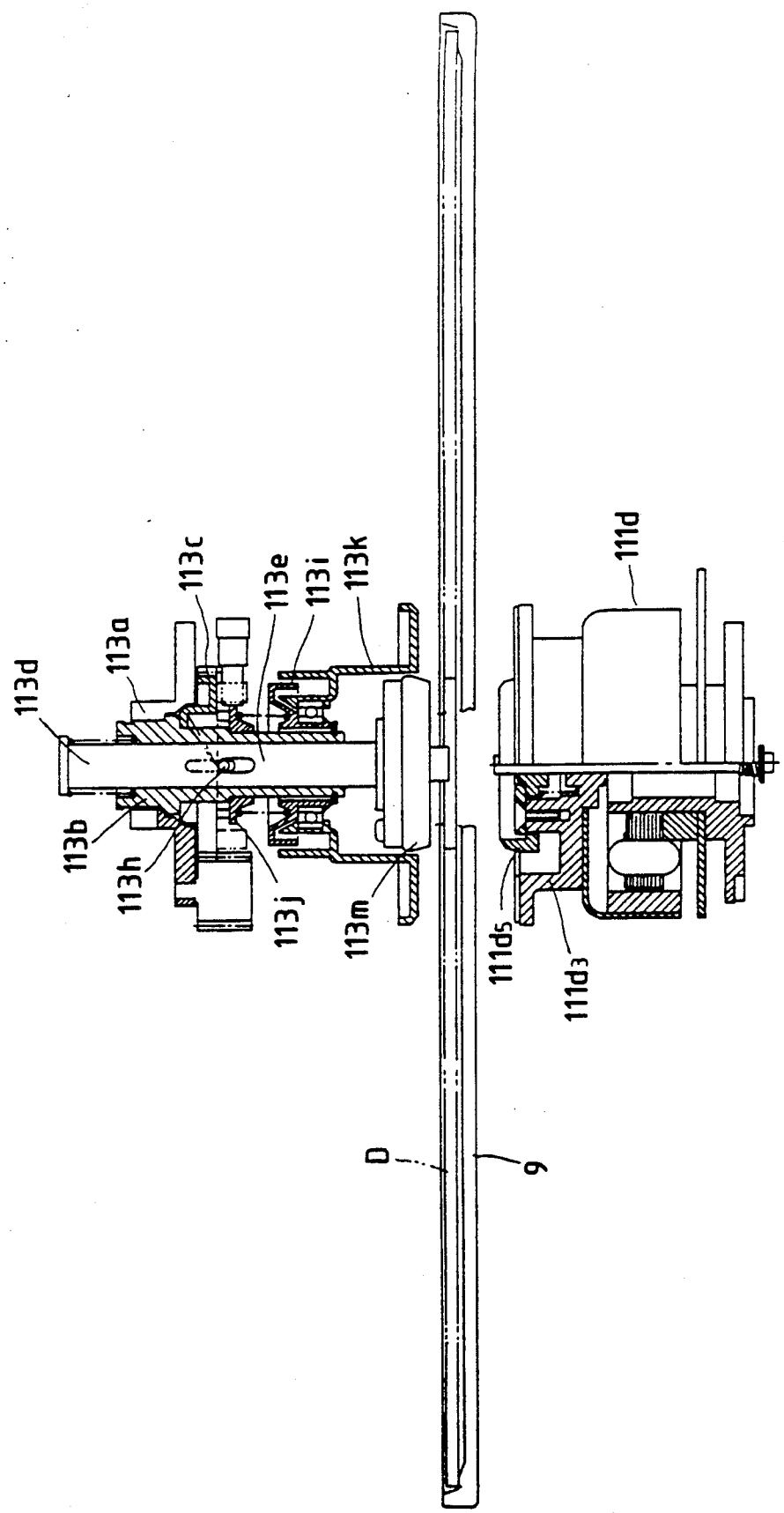
Figure 25:
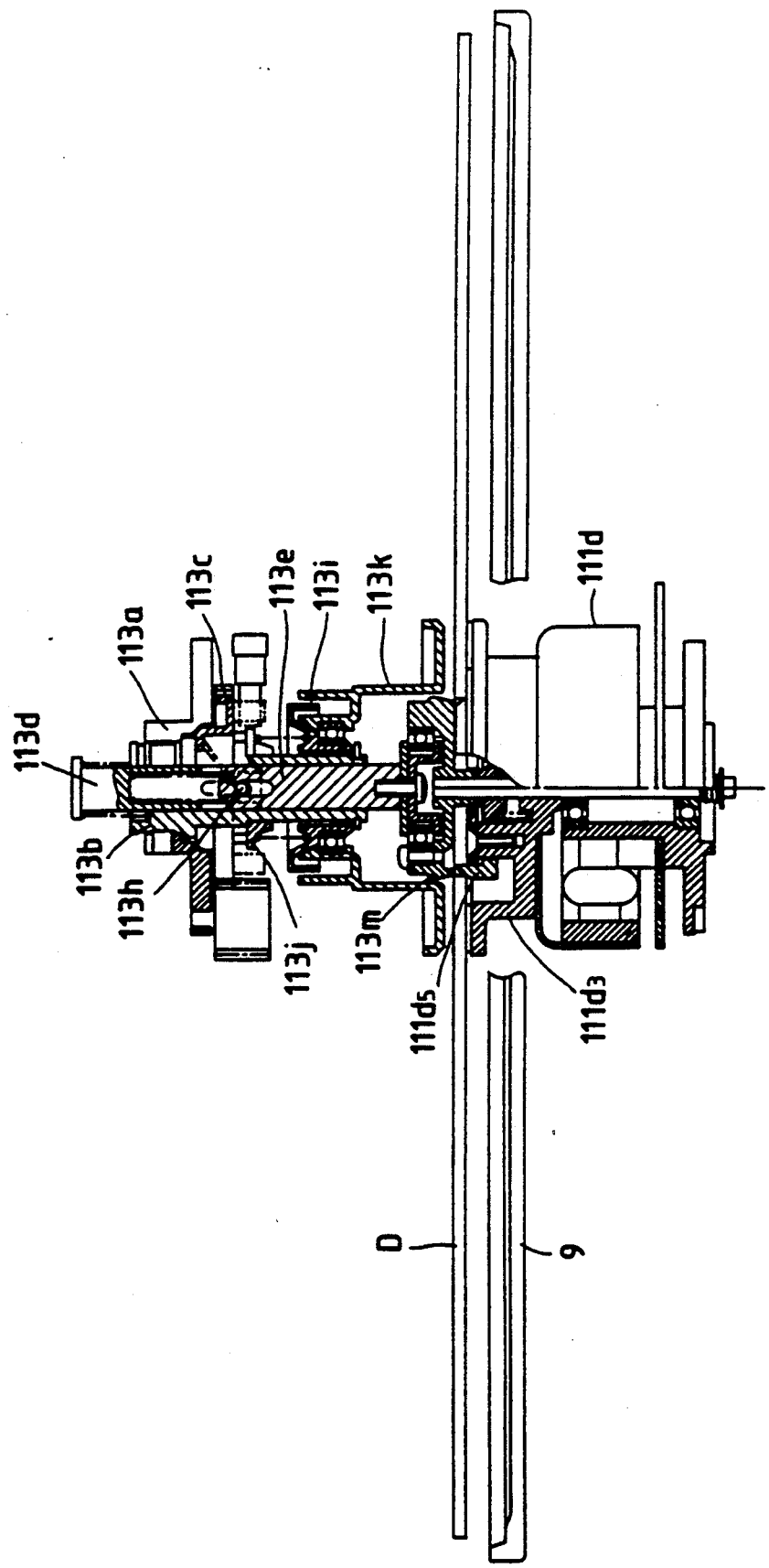

Pinching the disk D by the turntable unit 111$d$ and the camper 113 to play the disk is described from now on. When an instruction for playing the lower side of the disk D contained in the tray 9 as shown in FIG. 22 is applied as the tray is in the tray guides 111$k_3$ of the tray moving frame 111$k$, the sliding plates 111$g$ are moved so that the pickup base 111$f$ is lifted. As a result, the turntable unit 111$d$ is moved up. At that time, the position restricting plate 111$d_5$ is inserted up into the center hole of the disk D so that the disk is positioned by the turntable unit 111$d$. When the turntable unit 111$d$ is moved up further, the body 111$d_3$ thereof pushes up the disk D toward the disk push plate 113$k$ of the clamper 113 so that the disk is pinched between the turntable unit body and the disk push plate as shown in FIG. 23. The motor 111$d_2$ of the turntable unit 111$d$ is then driven to rotate the disk D to read the recorded information therefrom as the pickup 111$e$ is moved. When an instruction for playing the upper side of the disk D contained in the tray 9 (the disk pinched between the turntable unit 111d and the clamper 113 can be returned into the tray 9 by an operation reverse to that described above) is applied, the motor 112b is driven so that the final gear 112$c_1$ of the speed reduction gear train 112c is rotated to turn the gear 113c of the clamper until the operating pin 113$c_1$ of the gear 113c comes into contact with the switch 113$a_1$. At that time, the pin 113h is moved down due to the action of the cam portion 113$c_2$ of the gear 113c so that the hollow shaft 113d and the rod 113e are moved down against the force of the spring 113g. As a result, the central tubular portion 113$m_2$ of the position restricting plate 113m is inserted down into the center hole of the disk D as shown in FIG. 24. The sliding plates 111g are moved similarly to the above-described operation for the playing of the lower side of the disk D so that the turntable unit 111d is lifted. Since the position restricting plate 113m is already in a moved-down position at that time, the fixed center shaft 111$d_1$ of the turntable unit 111d is inserted up into the central tubular portion 113$m_2$ of the position restricting plate. Besides, the position restricting plate 111$d_5$ is inserted into the center hole of the disk D, and the top of the body 111$d_3$ of the turntable unit 111d comes into contact with the lower side of the disk, as shown in FIG. 25. When the turntable unit 111d is moved up further, the central portion of the position restricting plate 111$d_5$ comes into contact with the lower end of the central tubular portion 113$m_2$ of the position restricting plate 113m of the clamper 113 so that the position restricting plate 111$d_5$ is stopped by the other position restricting plate 113m. The body 111$d_3$ of the turntable unit 111d is then lifted further so that the disk D is moved up by the body 111$d_3$ of the unit. As a result, the disk D is separated from the position restricting plate 111$d_5$ at the center hole of the disk and then fitted on the peripheral potion 113$m_1$ of the position restricting plate 113m at the center hole of the disk so that the disk is positioned by the plate 113m. When the lifting of the turntable unit 111d is completed, the body 111$d_3$ of the turntable unit pushes the disk D to the disk push plate 113k of the clamper 113 to pinch the disk between them as shown in FIG. 26. The motor 111$d_2$ of the turntable unit 111d is then driven so that the disk D is rotated to be played.

The operation of the automatic disk changer as a whole is described from now on. When a desired program such as accompaniment music is chosen by a manipulating section not shown in the drawings, a control section not shown in the drawings judges which disk D the desired program is recorded in. The moving rest 6 is then moved depending on the result of the judgement so that the guide grooves 15b are made coincident with the tray guide 8 or 8' holding the disk D having the program. The motor 6i is then driven so that the swing plate 13 is swung rightward or leftward. Then the motor 10a is operated and the tray guide 15 is moved backward, the projections 8a of the tray guide 8 or 8' and the elastic engagement lugs 9f of the tray i are disengaged from each other by the disengaging pins 10o, and the engagement arms 10k and the hooks 9g of the tray 9 are engaged with each other. After that, the motor 10a is rotated in reverse so that the tray 9 is pulled out from the tray guide 8 or 8' into the guide grooves 15b. The motor 6i is then rotated in reverse so that the swing plate 13 is swung back to the neutral position. The moving rest 6 is thereafter moved to the upper or lower disk player 11 or 11' so that the guide grooves 15b of the tray transfer means 10 are made coincident with the tray guides 111$k_3$ of the lower disk player unit 111 of the upper or lower disk player 11 or 11'. At that time, if the upper disk player 11 is in playback, the moving rest 6 is moved to the lower disk player 11'. If the lower disk player 11' is in playback, the moving rest 6 is moved to the upper disk player 11. The motor 10a is then driven to move the moving plate 15 backward to transfer the tray 9 out of the guide grooves 15b to the tray guides 111$k_3$ so that the elastic engagement lugs 9f of the tray are engaged with the projections 111$k_4$ and the tray is held in the tray guides 111$k_3$ by the presence of the push plate 111n. The motor not shown in the drawings is then driven to move the sliding plates 111g to lift the turntable unit 111d to move up the disk D from the tray 9, pinch the disk between the turntable unit and the clamper 113 and position the disk by the turntable unit. After the positioning of the disk D is completed, the tray moving frame 111k is moved rightward by the movement of the sliding plates 111g. As a result, the tray 9 is put out of the range of the movement of the pickup 111e by shifting the window 9h so that recorded information can be read from the lower side of the disk by the pickup as it is moved along the disk. If recorded information is to be read from the upper side of the disk D, the motor 112b is first driven so that the position restricting plate 113m is moved down. The sliding plates 111g are thereafter moved so that the disk is pinched between the turntable unit 111d and the clamper 113 and positioned by the clamper. The pickup 112d is then moved to read the recorded information from the upper side of the disk D. After the reading of the recorded information from the disk D is completed, the disk is put back into the tray 9 and returned into the tray guide 8 or 8' by an operation reverse to that described above.

According to the present invention, a disk in a tray is pinched and moved up by a turntable unit and a clamper and the tray is thereafter moved in the direction of movement of a pickup. For that reason, the size of the window of the tray can be substantially reduced to make the size of the tray smaller to diminish the cost of the material of the tray and render compact a case for housing the tray.

We claim:
1. An automatic disk changer comprising:
trays for holding disks to be stored and played back;
  each said tray being shaped to hold a disk therein and having an opening therein through which a transducer can access the disk; said tray having a circumference slightly greater than a circumference of a disk held therein, such that said opening does not expose an outer radial region of said disk when said disk is stored therein;
a disk player for playing said disks; and
transfer means for transferring selected trays to said disk player for playing of the disk on said selected tray;
said disk player comprising; a turntable, a transducer, means for lifting said disk out of said selected tray and clamping said disk in a playback position, and means for moving said selected tray slightly radially with respect to said disk to expose to said transducer a portion of said disk including an entire radius of an information content portion of said disk.

2. An automatic disk changer as claimed in claim 1, wherein said means for moving said selected tray comprises:
- a tray moving frame having tray guides thereon to receive and hold a said selected tray provided thereto by said transfer means, and
- means for moving said tray moving frame laterally, with respect to a direction of insertion of said selected tray in said tray moving frame, after the disk in said selected tray has been lifted therefrom and clamped in a playback position.

3. An automatic disk changer as claimed in any of claims 2 and 3 wherein each said tray has a continuous circumferential supporting surface supporting and thereby masking an entire peripheral portion of the disk which is on a corresponding said tray, and wherein said opening extends continuously from said continuous circumferential supporting surface in a straight line towards and past the center of said disk, such that when said selected tray is moved laterally along an axis of said opening, an entire radial line of said disk is exposed by said opening.

4. An automatic disk changer as claimed in claim 3, wherein said disk player further comprises;
- support shafts;
- a pick up base holding said transducer and moveable up and down on said support shafts to move said transducer into operational engagement with and out of operational engagement with said disk, respectively, and;
- cam means for controlling movement of said pick up base.

5. An automatic disk changer as claimed in claim 4, wherein said tray moving frame has abutments thereon, and wherein said means for moving said selected tray comprises at least one slide plate positioned to slide laterally and at one point in its slide to engage said abutments to cause said tray moving frame to move laterally with said slide plate during a portion of the sliding movement thereof.

6. An automatic disk changer as claimed in claim 5, wherein said cam means comprises;
- a cam slot in said slide plate;
- a swing arm having a cam follower thereon riding within said clam slot; and
- means connecting a free end of said swing arm to said pick up base,
- whereby initial movement of said slide plate causes said swing arm to pivot and lift said pick up base to place said transducer in operational engagement with said disk and subsequent movement of said slide plate causes lateral movement of said selected tray.

* * * * *